(12) United States Patent
Ohmuro et al.

(10) Patent No.: US 7,532,183 B2
(45) Date of Patent: *May 12, 2009

(54) LIQUID CRYSTAL DISPLAY DEVICE AND ITS DRIVE METHOD

(75) Inventors: Katsufumi Ohmuro, Kawasaki (JP); Arihiro Takeda, Kawasaki (JP); Hideo Chida, Kawasaki (JP); Kimiaki Nakamura, Kawasaki (JP); Yoshio Koike, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 324 days.

This patent is subject to a terminal disclaimer.

(21) Appl. No.: 11/217,031

(22) Filed: Aug. 31, 2005

(65) Prior Publication Data
US 2006/0017677 A1    Jan. 26, 2006

Related U.S. Application Data

(60) Division of application No. 09/874,442, filed on Jun. 5, 2001, now Pat. No. 6,952,192, which is a continuation of application No. PCT/JP99/06189, filed on Nov. 5, 1999.

(30) Foreign Application Priority Data

Dec. 8, 1998 (JP) ............................... 10-348914
Mar. 19, 1999 (JP) ................................. 11-75963

(51) Int. Cl.
G09G 3/36 (2006.01)
(52) U.S. Cl. .......................................... 345/87; 345/96
(58) Field of Classification Search ........... 345/87–104, 345/38, 50–54
See application file for complete search history.

(56) References Cited

U.S. PATENT DOCUMENTS 5,594,569 A    1/1997    Konuma et al.

(Continued)

FOREIGN PATENT DOCUMENTS

JP    5-100208    4/1993

(Continued)

OTHER PUBLICATIONS

Takeda et al., "A Super-High-Image-Quality Multi-Domain Vertical Alignment LCD by New Rubbing-Less Technology," SID 98 Digest, pp. 1077-1080.

*Primary Examiner*—Jimmy H Nguyen
(74) *Attorney, Agent, or Firm*—Greer, Burns & Crain, Ltd.

(57) ABSTRACT

A MVA type liquid crystal panel is slow in a response speed when a black state at a drive voltage about 1V is switched to a low brightness halftone state at the drive voltage about 2 to 3V. According to the present invention, in a liquid crystal display device for driving the MVA type liquid crystal panel, when a liquid crystal pixel at a pixel electrode is changed from a first transmittance to a second transmittance greater than the first transmittance, a drive voltage greater than a fist target drive voltage in correspondence with a second transmittance is applied to the pixel electrode in a first frame period of changing to the second transmittance, and the first target display voltage is applied from a second frame period. According to the present invention, even when either switching is performed from a black state to a low brightness halftone state, from the black state to a high brightness halftone state, for from the black state to a white state, a response time is shortened, and the switching can be performed without generating an overshoot.

6 Claims, 21 Drawing Sheets

U.S. PATENT DOCUMENTS

| | | |
|---|---|---|
| 5,844,533 A | 12/1998 | Usui et al. |
| 6,097,464 A | 8/2000 | Liu |
| 6,304,304 B1 | 10/2001 | Koma |
| 6,661,488 B1 | 12/2003 | Takeda et al. |
| 6,952,192 B2 * | 10/2005 | Ohmuro et al. ............... 345/87 |

FOREIGN PATENT DOCUMENTS

| | | | |
|---|---|---|---|
| JP | 07-311383 | | 11/1995 |
| JP | 07311383 | A | 11/1995 |
| JP | 08-012373 | | 1/1996 |
| JP | 10-039837 | | 2/1998 |
| JP | 10293307 | A | 11/1998 |
| JP | 11242225 | A | 7/1999 |
| JP | 11-223807 | | 8/1999 |
| KR | 1999-45465 | | 6/1999 |

* cited by examiner

FIG. 20A  No Compensation
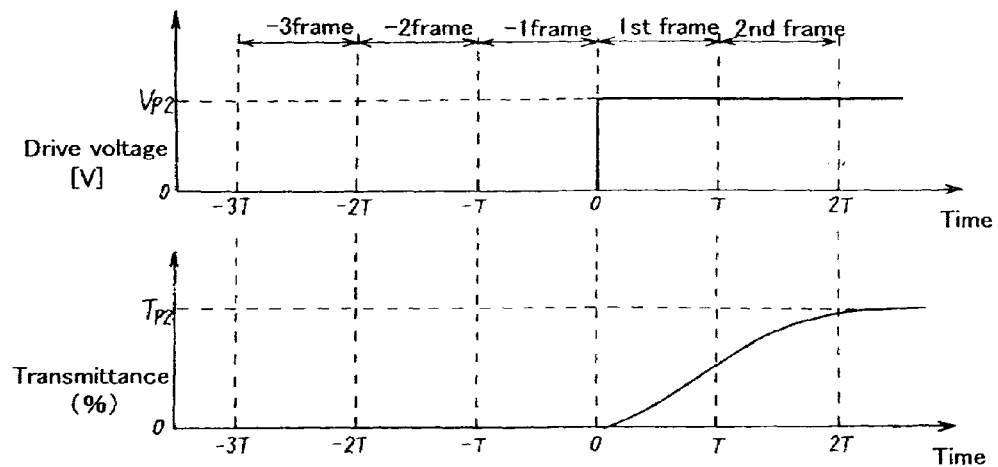
FIG. 20B
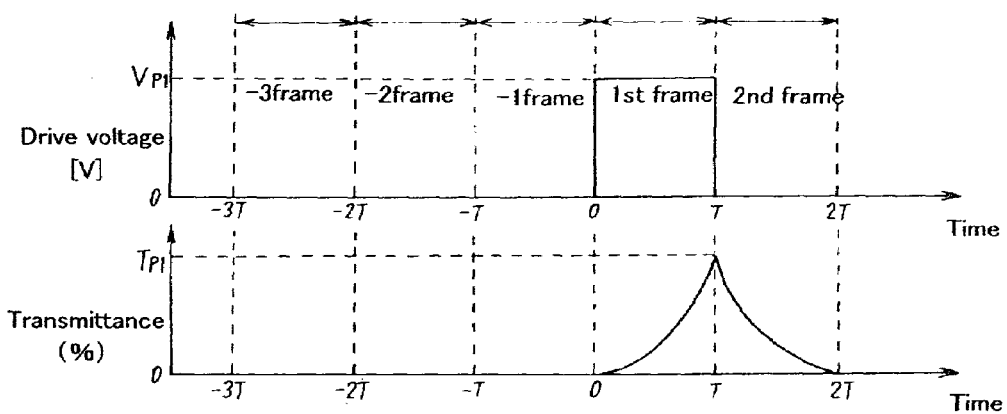
FIG. 20C  With Compensation
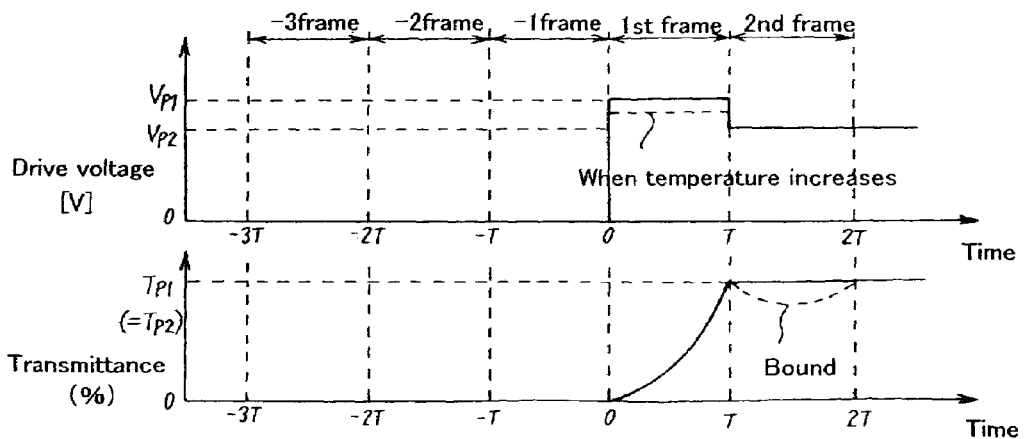

LIQUID CRYSTAL DISPLAY DEVICE AND ITS DRIVE METHOD

This is a divisional of U.S. patent application Ser. No. 09/874,442, filed Jun. 5, 2001 now U.S. Pat. No. 6,952,192, which is a continuation of International PCT/JP99/06189, filed Nov. 5, 1999.

TECHNICAL FIELD

The present invention relates to a liquid crystal display device and its drive method, and in particular to the liquid crystal drive device in which a liquid crystal having minus dielectric constant anisotropy is aligned vertically when non-voltage is applied; and its drive method.

BACKGROUND ART

At present, in a liquid crystal panel which carries out active matrix drive by use of a thin film transistor (hereinafter called TFT), its mainstream is a TN (Twisted Nematic) mode liquid crystal panel in which a p type liquid crystal having positive dielectric anisotropy is aligned horizontally to a substrate when non-voltage is applied, and is driven vertically to the substrate when voltage is applied.

With the progress of late manufacturing technology, the TN mode liquid crystal panel has been improved conspicuously in contrast, a gradation characteristic, and color reproducibility seen from the facade of the liquid crystal panel. However, the TN mode liquid crystal mode has drawbacks that a viewing angle is narrower than CRT, etc., and for this reason there is a problem that the use is restricted.

For the purpose of improving the drawback of the TN mode liquid crystal panel that the viewing angle is narrow, we, the applicant of this invention, developed a MVA (Multidomain Vertical Alignment) type liquid crystal panel which drives horizontally, when voltage is applied, liquid crystal molecules aligned vertically when non-voltage is applied, and in which an alignment direction of the liquid crystal molecules in one pixel is divided into a plurality of parts, and disclosed the structure in Japanese Patent Application Laid-Open No. 10-185836, etc.

The MVA type liquid crystal panel uses an n type liquid crystal having negative dielectric anisotropy and the MVA type liquid crystal panel is provided with domain restriction means for, when voltage is applied, restricting an alignment direction of the liquid crystal so that the direction is set to be a plurality of parts in one pixel.

The domain restriction means incline in advance the liquid crystal molecules at a projection part at a slight angle when non-voltage is applied, by the projection, etc. provided in a part on an electrode. This projection performs a role of a trigger for determining the alignment direction of the liquid crystal molecules when voltage is applied, and any small projection is enough. Incidentally, as the MVA type liquid crystal panel inclines in advance the liquid-crystal molecules at a slight angle by the domain restriction means, a rubbing process to a vertical alignment layer or alignment film is unnecessary.

In the MVA type liquid crystal, in a state that non-voltage is applied, most of liquid crystal molecules are aligned vertically to a surface of the substrate, and the transmittance becomes a status of 0 (black state) When an intermediate voltage is applied, the inclination direction of the liquid crystal molecules is determined under the influence of an inclined plane of the projection, and the alignment direction of the liquid crystal in one pixel is partitioned. Accordingly, the intermediate voltage causes an optical characteristic of the liquid crystal in one pixel to average, thereby obtaining a half tone state uniform in all directions. Furthermore, when a predetermined voltage is applied, the liquid crystal molecules are substantially horizontal to change to a white state.

However, in the MVA liquid crystal panel, there is a problem that a response speed when a black state at a drive voltage of about 1V is switched to a low brightness halftone state at a drive voltage of about 2 to 3V is slower than the TN mode liquid crystal panel.

It is considered that this is because, since the-rubbing process in the vertical alignment film is not carried out in the MVA type liquid crystal and the alignment directions of the liquid crystals in a fine region direct to various directions in a state that non-voltage is applied, when a drive voltage is low at about 2 to 3V, it takes some time to align the alignment directions of all the liquid crystals to predetermined directions.

Furthermore, when the black state at the drive voltage of about 1V is switched to a high brightness halftone state at the drive voltage of about 3 to 4V, or when the black state at the drive voltage of about 1V is switched to a white state at the drive voltage of about 5V, as the brightness is overshot, there is a problem that a display impression is worse.

It is considered that this is because, as a moment of rotating the alignment direction of the liquid crystal increases at the drive voltage of about 3V or more, the alignment direction of the liquid crystal rotates over the target alignment direction.

Furthermore, when the black state is switched to a halftone state or so, the halftone state or so is affected by not only the black state shortly before that but also a further previous display state, and the brightness may be overshot. It is considered that this is because the alignment state of the liquid crystal in the black state shortly before that differs due to the previous alignment state of the liquid crystal.

Then, it is an object of the present invention to provide a liquid crystal display device having a drive circuit in which when driving the MVA type liquid crystal panel in which n type liquid crystals are aligned vertically, a response time when the black state is switched to the low brightness halftone state is lessened, and the overshoot when the black state is switched to the halftone state or the white state is diminished; and its drive method.

DISCLOSURE OF THE INVENTION

The above object is attained by providing the following liquid crystal display device: The liquid crystal display device includes domain restriction structure for restricting so that a liquid crystal is provided between a pixel electrode and a counter electrode to which voltage is applied, and an alignment of the liquid crystal is substantially vertical when non-voltage is applied, substantially horizontal when a predetermined voltage is applied, and inclined when a smaller voltage than the predetermined voltage is applied, and further a direction that the alignment of the liquid crystal is inclined is set to be a plurality of parts in each pixel when a voltage smaller than the predetermined voltage is applied, and further comprises a drive circuit in which when the pixel is changed from a first transmittance to a second transmittance greater than the first transmittance, a voltage greater than a first target drive voltage corresponding to the second transmittance is applied on a pixel electrode in a first period of changing to the second transmittance, and the first target display voltage is applied in a second period after the first period According to the present invention, when the liquid crystal in the pixel is changed from the first transmittance to the second transmittance, as a voltage greater than the first target drive voltage is applied in the first period, and the first target display voltage is applied in the second period after the first period, in the MVA type liquid crystal panel in which the alignment directions of the liquid crystal in a minute region direct to various directions in a state that a voltage is applied, the response time when the alignment direction of the liquid crystal therein is changed can be reduced Accordingly, it is possible to provide the liquid crystal display device with a wide viewing angle and a superior response characteristic.

Furthermore, in the drive circuit of the liquid crystal display device according to the present invention, when the pixel is changed from the first transmittance to a third transmittance greater than the second transmittance, a second target drive voltage in correspondence with the third transmittance is applied on the pixel electrode in the first period of changing to the third transmittance.

According to the present invention, when the liquid crystal in the pixel is changed from the first transmittance to the third transmittance much greater than that, as the second target drive voltage in correspondence with the third transmittance is applied in the first period, it is possible to reduce the response time without causing the overshoot with respect to the change in the alignment of the liquid crystal. Accordingly, it is possible to provide the liquid crystal display device which is free of flicker due to the overshoot, and has the superior response characteristic.

BRIEF DESCRIPTION OF THE DRAWINGS

FIGS. 20A, 20B and 20C are explanatory views showing a compensation principle according to the embodiment of the present invention;

FIG. 25 is a diagram showing a relationship between the maximum transmittance Tp1 of the first frame and a drive voltage Vn-1 shortly before that.

BEST MODE FOR CARRYING OUT THE INVENTION

Hereinafter, an embodiment of the present invention will be described with reference to the drawings. However, such the embodiment does not restrict a technical scope of the present invention.

First Embodiment

Figure 1:
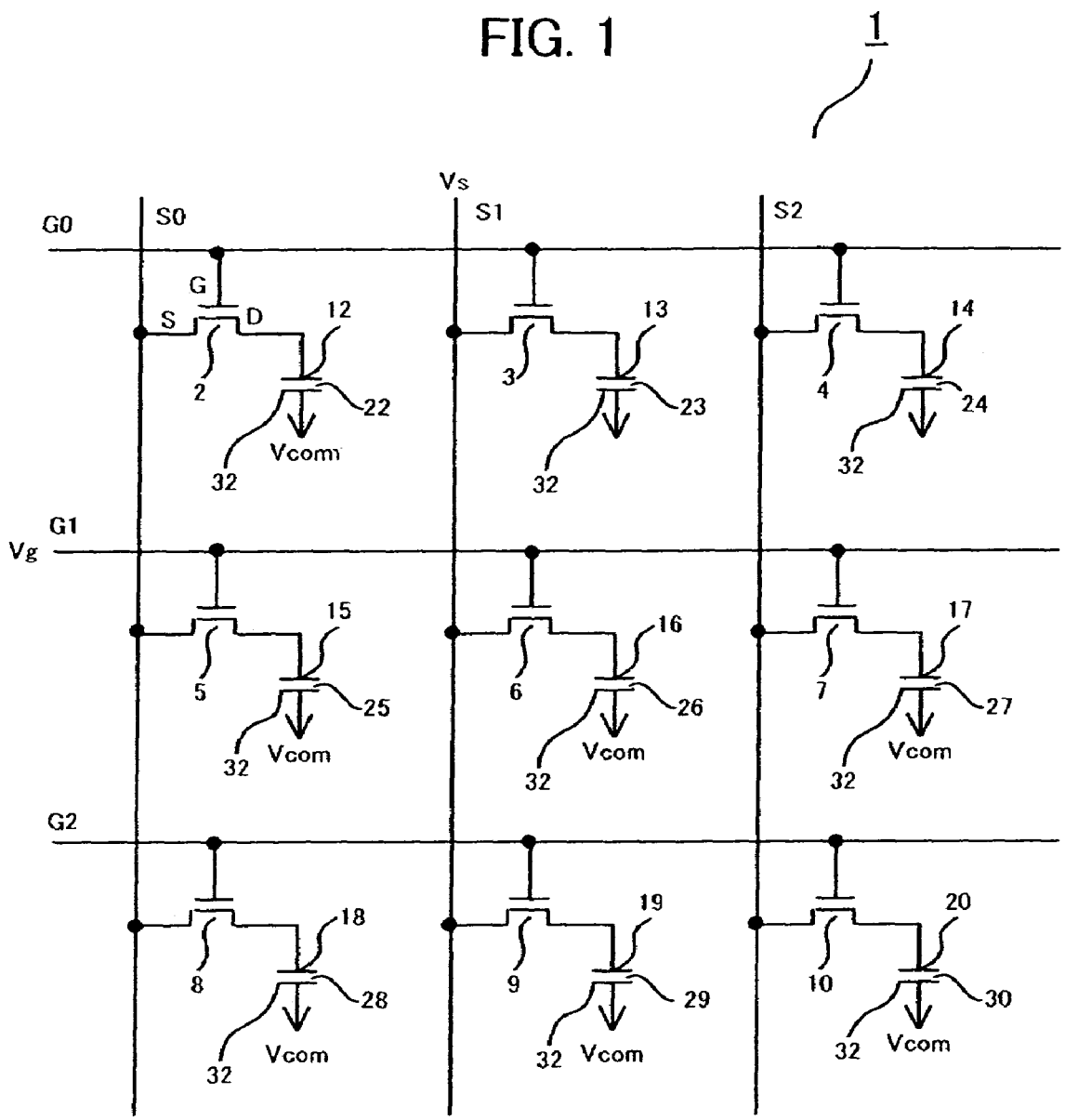
FIG. 1 is an equivalent circuit of a MVA type liquid crystal panel according to an embodiment of the present invention.

FIG. 1 is an equivalent circuit of a MVA type liquid crystal panel 1 according to an embodiment of the present invention. The actual MVA type liquid crystal panel 1 has 1024×3×768 pixels, for example, when a color display is made, but here shows the case of 3×3 pixels.

The MVA type liquid crystal panel 1 is assorted into respective pixels by longitudinal source electrode lines S0, S1, S2 and transverse gate electrode lines G0, G1, G2, and has TFTs 2 to 10 in each of respective pixels. A source electrode S and a gate electrode G of the TFTs 2 to 10 are connected to the source electrode lines S0 to S2 and the gate electrode lines G0 to G2, respectively, and a drain electrode D is connected to pixel electrodes 12 to 20.

The pixel electrodes 12 to 20 are transparent electrodes of ITO (IndiumTinOxide), etc., and a drive voltage is applied on liquid crystal pixels 22 to 30 inserted between the pixel electrode and a counter common electrode 32. The common electrode 32 is an ITO transparent electrode covering the substantially entire plane of a liquid crystal panel, and a common voltage Vcom is applied thereon.

Figure 2A:
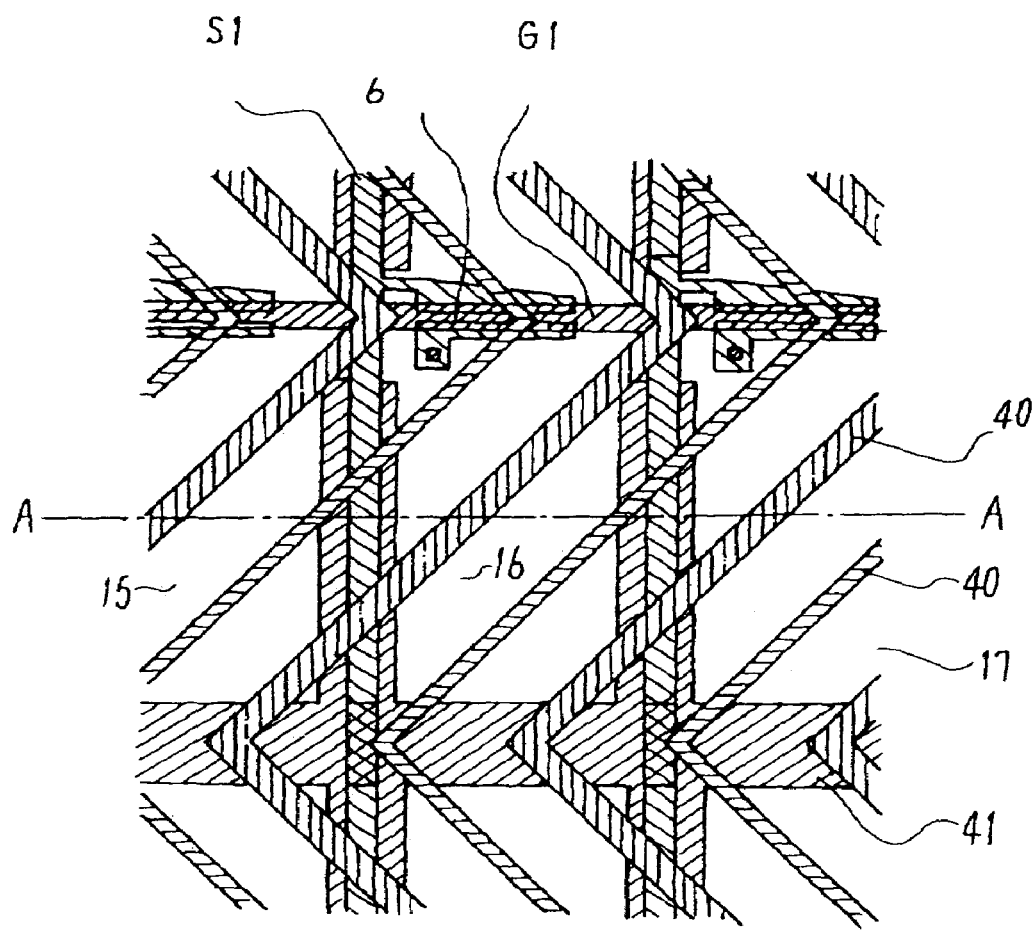
FIGS. 2A and 2B are schematic views of the MVA type liquid crystal panel according to the embodiment of the present invention.
Figure 2B:
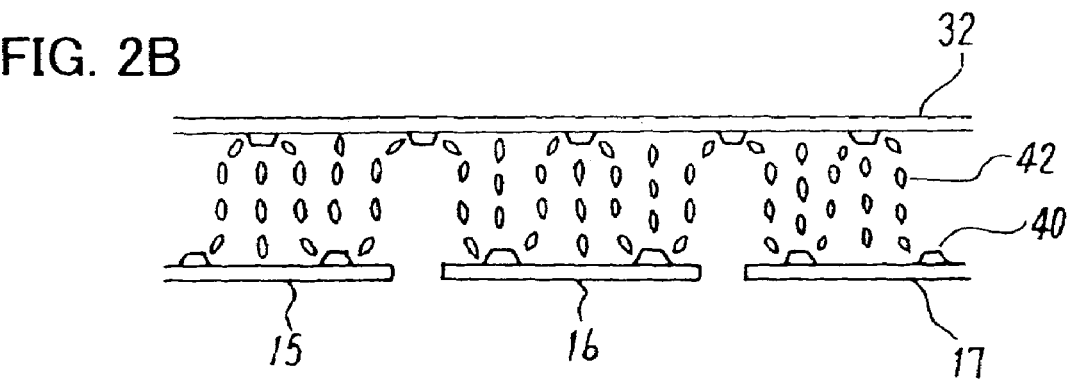

FIG. 2 is a schematic view of the MVA type liquid crystal panel 1 according to this embodiment, and FIG. 2A is a plane view seen from upward of partial pixel electrodes 15 to 17 in FIG. 1, and FIG. 2B is a cross-sectional view taken along line A-A of FIG. 2A.

As shown in FIG. 2A, a projection 40 bending zigzag is provided on the pixel electrodes 15 to 17. This projection 40 functions as domain restriction structure which splits its alignment direction of a liquid crystal in one pixel into a plurality of parts. The pixel electrode 16 exists in a part assorted by a source electrode line SI and a gate electrode line G1, and is connected to a TFT 6. Incidentally, a CS electrode 41 is an electrode for forming auxiliary capacitance.

Furthermore, as shown in FIG. 2B, the projections 40 are formed alternately in both the common electrode 32 and pixel electrodes 15 to 17, and a vertical alignment film (not shown) is provided thereon. Liquid crystal molecules 42 are aligned substantially vertically to a surface of an electrode by a vertical alignment film when non-voltage is applied, but as the vertical alignment film is not rubbed, the liquid crystal molecules 42 existing on a lateral inclined plane of the projection 40 are apt to align vertically to the inclined plane. Therefore, the liquid crystal molecules 42 of the part are inclined at only a predetermined angle.

The liquid crystal molecules 42 inclined in a part of the projection 40 perform such a trigger role as determining alignment directions of the other liquid crystal molecules 42 when voltage is applied. For this reason, when voltage is applied, as the directions that the liquid crystal molecules 42 are inclined are split into a plurality of parts in one pixel, visual angle dependency disappears, thereby obtaining omnidirectional uniform display.

Figure 3A:
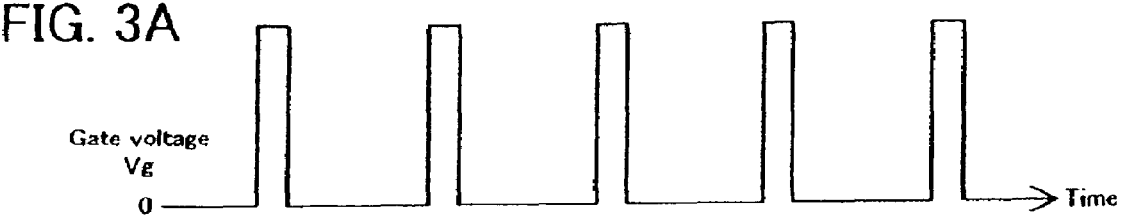
FIGS. 3A, 3B and 3C are waveform diagrams of a drive voltage of a liquid crystal display device according to the embodiment of the present invention.
Figure 3B:
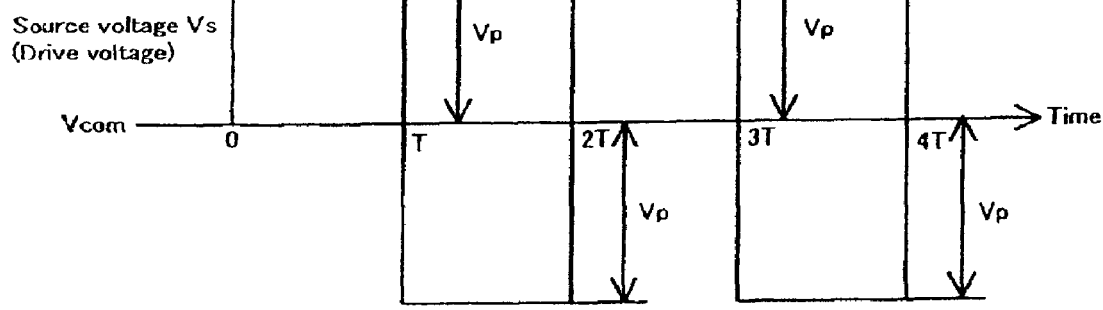
Figure 3C:
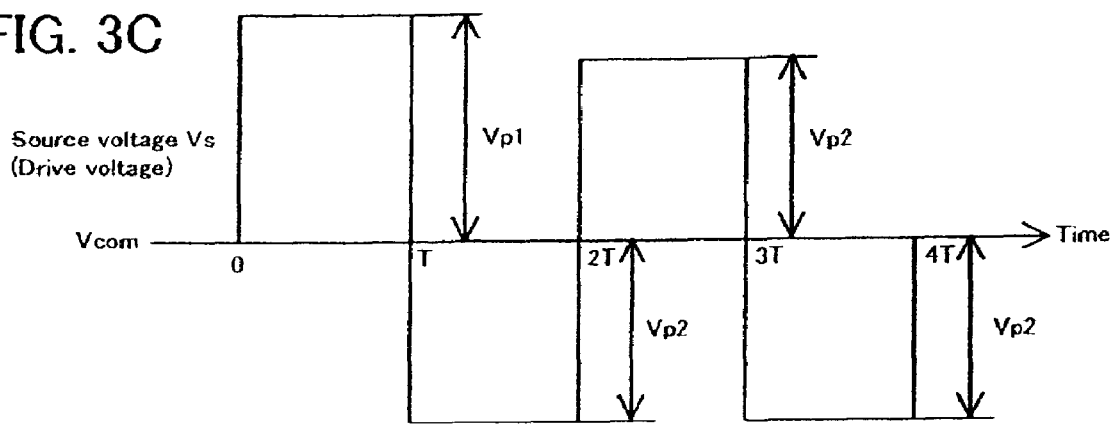

FIG. 3 is a waveform diagram of a drive voltage of the liquid crystal display device according to the embodiment of the present invention. FIG. 3A is a waveform of a gate voltage Vg to be applied on a gate electrode of TFT, and FIGS. 3B and 3C are examples of waveforms of a source voltage Vs to be applied on a source electrode of the TFT. When the TFT is energized by applying the gate voltage Vg, this source voltage Vs becomes a drive voltage to be applied on respective liquid crystal pixels 22 to 30.

For example, in FIG. 1, if the source voltage Vs is applied on the source electrode line S1, and the gate voltage Vg is applied on the gate electrode line G1, TFT 6 is conductive and the drive voltage is applied on the pixel electrode 16 corresponding to the liquid crystal pixel 26.

Furthermore, the source voltage Vs of FIGS. 3B and 3C, is inverted every frame period with reference to a potential Vcom of the common electrode 32. This is because, since if a unidirectional voltage is always applied on the liquid crystal, the liquid crystal is deteriorated, the liquid crystal is driven at AC voltage.

FIG. 3B shows the case where a non-inverted drive voltage Vp is applied on the liquid crystal pixel in a first frame period Tf1 starting from time 0 and in a third frame period Tf3 starting from time 2T, and the inverted drive voltage Vp is applied thereon in a second frame period Tf2 starting from time T and in a fourth frame period Tf4 starting from time 3T. Generically, an alignment change of the liquid crystal due to the drive voltage application is slow, and for changing the liquid crystal alignment to transmittance incorrespondence with the drive voltage Vp, it is necessary that the drive voltage Vp is continuously applied over several frame periods. In the drive voltage waveforms of FIG. 3B, Vp is continuously applied over first to fourth frame periods in the same manner as such conventional drive voltage waveforms.

FIG. 3C shows an improved drive voltage waveform according to the embodiment of the present invention, and for improving a response speed and an overshoot of the liquid crystal pixel, a drive voltage Vp1 of the first frame period Tf1 is greater than a drive voltage Vp2 of a second frame period Tf2 and on.

According to the embodiment of the present invention, in correspondence with a type of transmittance change of the liquid crystal in the pixel, the drive voltage waveform of FIG. 3C and the drive voltage waveform of FIG. 3B are distinguished occasionally. Namely, a drive voltage ratio Vp1/Vp2 which optimizes the response speed and overshoot is different according to a target transmittance of the liquid crystal pixel. Then, a response characteristic of the transmittance will be explained below.

FIGS. 4 to 7 are diagrams for explaining the response characteristic of transmittance of the MVA type liquid crystal panel 1 according to the embodiment of the present invention. FIG. 4A shows the response characteristic, in a case where the target drive voltage Vp2 is set as 2.5V in order to change transmittance of a certain liquid crystal pixel from 0% to about 2%, when the drive voltage Vp1 of the first frame period Tf1 is set to be 0.8 times the drive voltage Vp2 of the second frame period Tf2 and on (Vp1/Vp2=0.8), and when the drive voltage Vp1 is equal to the drive voltage Vp2 (Vp1/Vp2=1), and when the drive voltage Vp1 is set to be 1.25 times the drive voltage Vp2 (Vp1/Vp2=1.25).

Figure 4A:
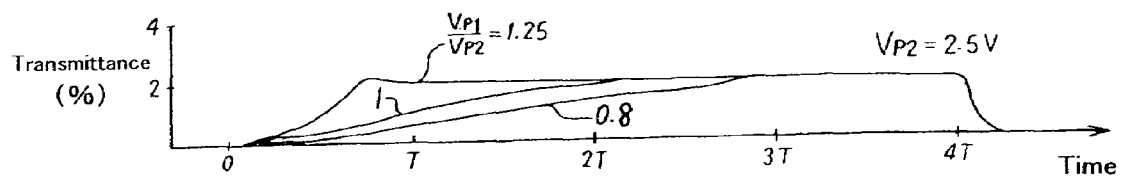
FIGS. 4A and 4B are response characteristic diagrams (I) of transmittance of the MVA type liquid crystal panel according to the embodiment of the present invention.
Figure 4B:
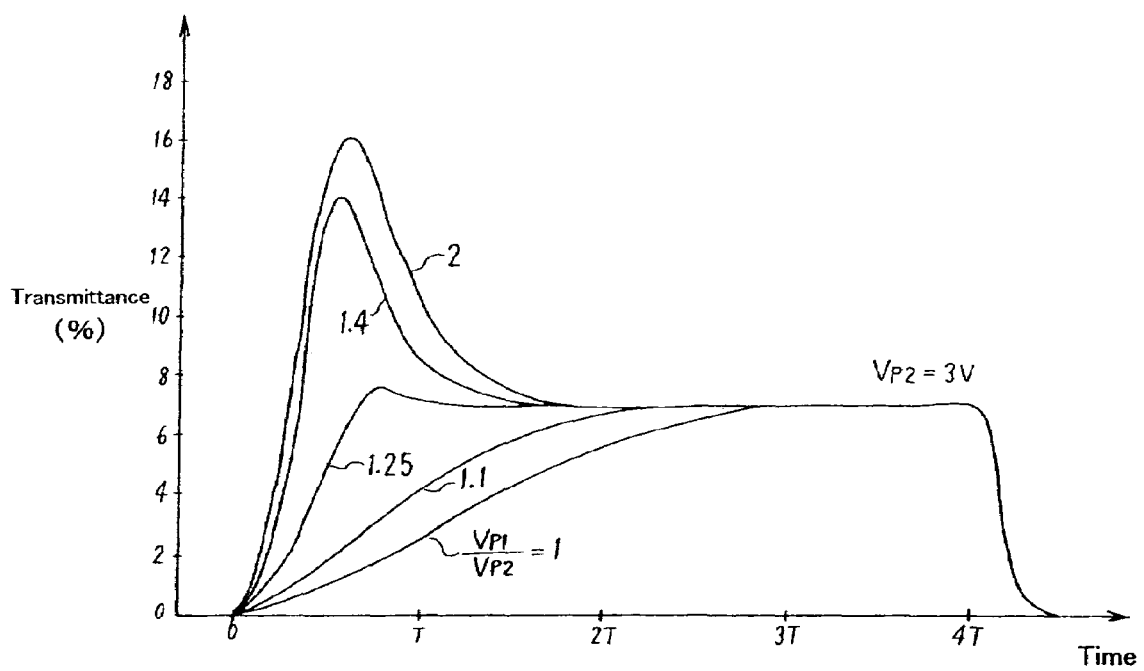

Furthermore, FIG. 4B shows the response characteristic in a case where the target drive voltage Vp2 is set as 3V in order to change transmittance from 0% to about 8%, when the drive voltage Vp1 is equal to the drive voltage Vp2 (Vp1/Vp2=1), and when the drive voltage Vp1 is set to be 1.1 times the drive voltage Vp2 (Vp1/Vp2=1.1), and when the drive voltage Vp1 is set to be 1.25 times the drive voltage Vp2 (Vp1/Vp2=1.25), and when the drive voltage Vp1 is set to be 1.4 times the drive voltage Vp2 (Vp1/Vp2=1.4), and when the drive voltage Vp1 is set to be 2 times the drive voltage Vp2 (Vp1/Vp2=2).

From the response characteristic of FIG. 4, when a black state having transmittance of almost 0% is switched to a low brightness halftone state having transmittance of about 10%, if the drive voltage ratio Vp1/Vp2 is set as 1.25, it is understood that the response time is lessened without the overshoot. Namely, the alignment change of the liquid crystal is completed in about a1-frame period (T=16.7 ms) from switching of the display, thereby changing to the target transmittance.

On the other hand, when Vp1/Vp2 is set to be 0.8, 1 and 1.1, the response speed is slow and it takes a 2-frame period or more until the liquid crystal reaches the target transmittance. If so, when an animation, etc. is displayed, an image is hard to see as the image falls into disorder. Furthermore, when Vp1/Vp2 is set to be 1.4 and 2, the response speed is fast, but an overshoot of the transmittance is generated and this contributes to a flicker of a display screen.

As described above, the vertical alignment film of the MVA type liquid crystal panel 1 is not rubbed, therefore the alignment directions of the liquid crystal in a minute region direct to various directions in a state that non-voltage is applied. For this reason, when the transmittance is changed from 0 to a second transmittance, it is considered that as the target drive voltage Vp2 in correspondence with the second transmittance is a low voltage of about 2 to 3V, it takes a lot of time to rotate the alignment directions of all the liquid crystals to a predetermined direction. Accordingly, it is considered that if the drive voltage Vp1 of the first frame period is set to be 1.25 times the target drive voltage Vp2, an optimal rotation moment can be given to liquid crystal molecules, and the response speed of the liquid crystal can be reduced.

In this method, when a black state having transmittance of almost 0% is switched to a low brightness halftone state having transmittance of about 10% or less, a drive waveform of FIG. 3C is preferable. With this drive waveform, as shown in FIG. 4, the target transmittance can be reached in a 1-frame period. Accordingly, the response completion is possible in each frame and an animation display is smoothed.

Figure 5A:
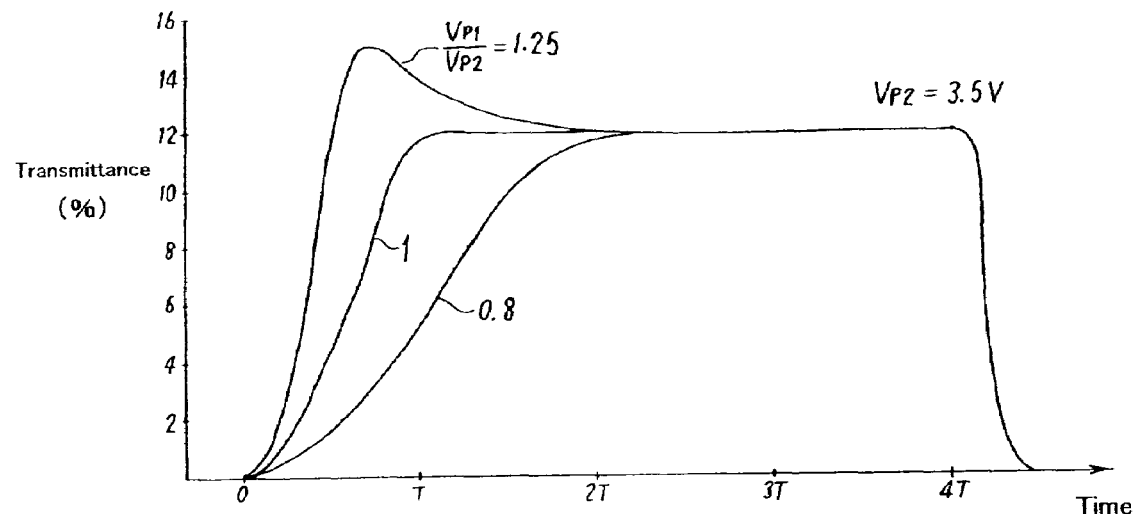
FIGS. 5A and 5B are response characteristic diagrams (II) of transmittance of the MVA type liquid crystal display panel according to the embodiment of the present invention.

FIG. 5A shows the case where the target drive voltage Vp2 is set to be 3.5V so that transmittance is changed from 0% to about 12%, and the drive voltage Vp1 of the first frame period is set to be 0.8, 1 and 1.25 times the target drive voltage Vp2.

In this method, when the black state is switched to a high brightness halftone state that transmittance is about 10 to 15%, if the drive voltage ratio Vp1/Vp2=1, it is comprehensive that the response time is decreased without the overshoot. In this case, when Vp1/Vp2=0.8, the response speed is slow, inversely when Vp1/Vp2=1.25, the response speed is fast, but the overshoot is generated to contribute to a flicker of a display screen.

It is considered that this is because when the target drive voltage Vp2 is about 3V or more, as a moment of rotating the alignment direction of the liquid crystal increases, if Vp1/Vp2 is increased, this contributes to the overshoot, inversely as the target drive voltage Vp2 is high, the response speed is sufficiently short even at the drive voltage ratio Vp1/Vp2=1.

Figure 5B:
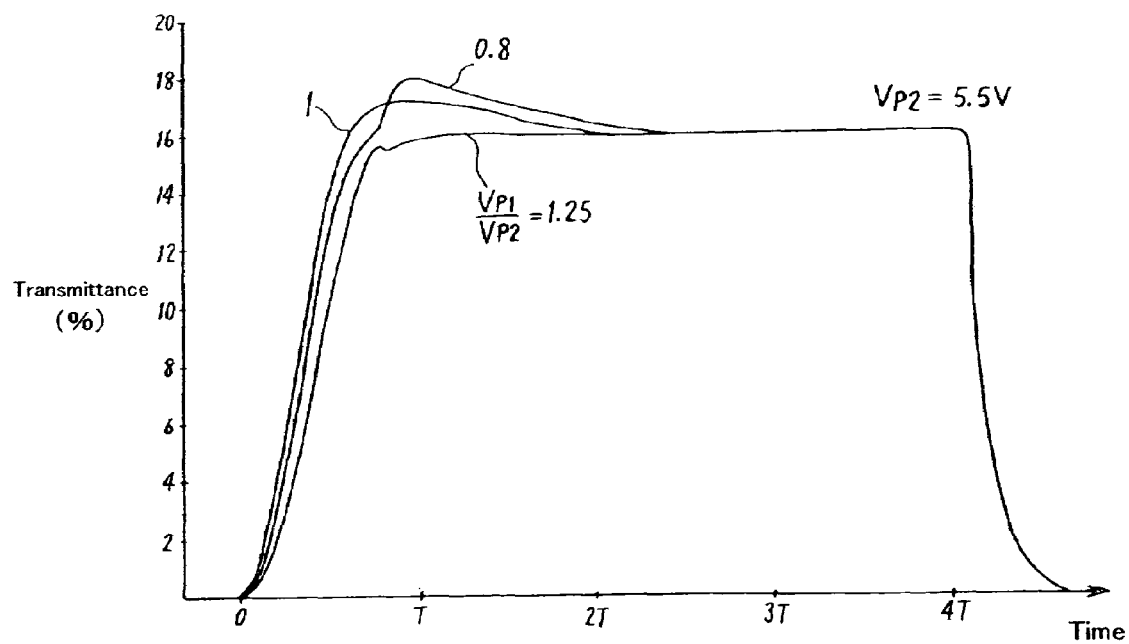

FIG. 5B shows the case where the target drive voltage Vp2 is set to be 5.5V in order to change transmittance from 0% to about 16%, and the drive voltage Vp1 of the first frame period is set to be 0.8, 1 and 1.25 times the target drive voltage Vp2.

In this method, when the black state is switched to a white state having transmittance of about 15% or over, if the drive voltage ratio Vp1/Vp2=1.25, it is comprehensive that the response time is lessened without the overshoot. In this case, when Vp1/Vp2=0.8 or 1, the response speed is fast, but the overshoot is generated, contributing to a flicker of the display screen.

Figure 6A:
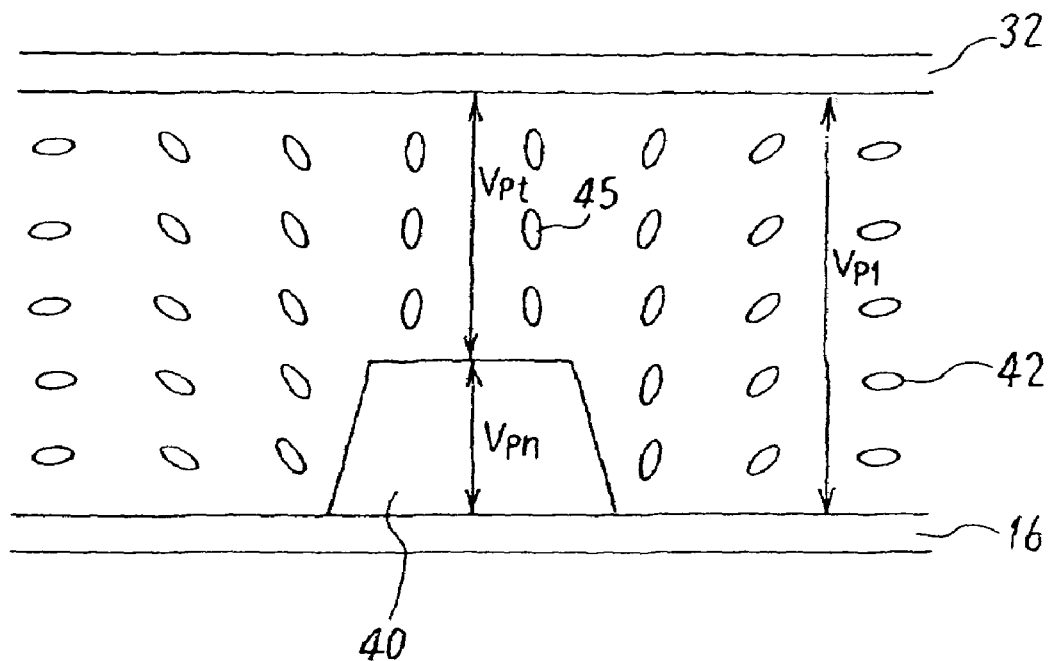
FIGS. 6A and 6B are diagrams for explaining the response characteristic of transmittance.

It is considered that this is because, when the drive voltage Vp1 is about 5V or more, liquid crystal elements in a projection part of the domain restriction structure start aligning. Namely, as shown in FIG. 6A, the drive voltage Vp1 is divided into a voltage Vpt and a voltage Vpn in a region of the projection 40, and the voltage Vpt smaller than the drive voltage Vp1 is applied to a liquid crystal molecule 45 on the region of the projection 40. In this case, when the drive voltage Vp1 is about 5V or less, as the voltage Vpt to the liquid crystal molecule on the region of the projection 40 is a threshold or less of the alignment of the liquid crystal molecule 45, the liquid crystal molecules 45 do not move. Accordingly, it is considered that when Vp1/Vp2=0.8 or 1, the operation of the liquid crystal molecules excluding the region of the projection 40 is dominant, therefore the response speed increases, the overshoot is generated.

Figure 6B:
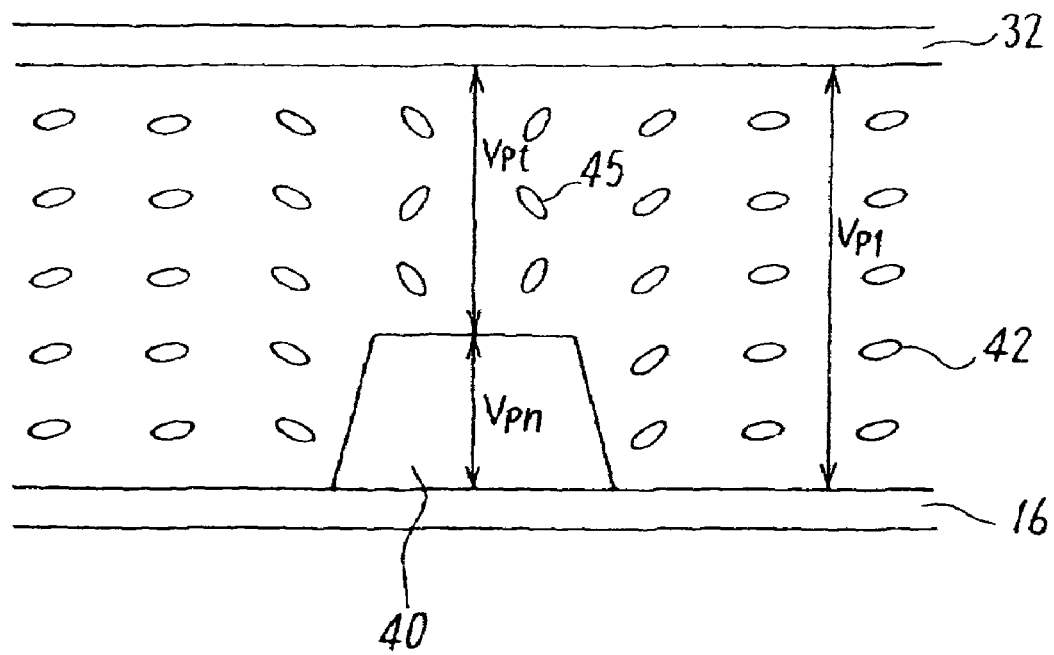

On the other hand, when the drive voltage Vp1 is about 5V or more, as shown in FIG. 6B, as the voltage Vpt of the region of the projection 40 is the threshold or more of the alignment of the liquid crystal molecule 45, the liquid crystal molecule 45 starts moving. However, as the alignment direction of the liquid crystal molecule 45 is not immediately stabilized, the entire response speed decreases. Accordingly, it is considered that when Vp1/Vp2=1.25, the operation of the liquid crystal molecule 45 on the region of the projection 40 starts in the first frame period Tf1, and as the operation delays, the overshoot lowers.

In this method, when the black state is switched to the white state having transmittance of about 15% or more, if the drive voltage ratio Vp1/Vp2=1.25, in comparison with Vp1/Vp2=1 and 0.8, the response speed can be optimized without the overshoot.

As is apparent from the results of FIGS. 4 and 5, (1) when the display of a certain pixel is switched from the black state to the low brightness halftone state, it is preferable that the drive voltage VP1 of the first frame period Tf1 is set to be, for example, 1.25 times the drive voltage VP2 of the second frame period Tf2 and on; (2) when the black state is switched to the high brightness halftone state, it is preferable that the drive voltage VP1 is equal to the drive voltage VP2; and (3) when the black state is switched to the white state, it is preferable that the drive voltage VP1 is set to be, for example, 1.25 times the drive voltage VP2. Accordingly, in the cases of (1) and (3) above, a waveform of FIG. 3C is preferable, and in the case of (2) above, the waveform of FIG. 3B is preferable. Incidentally, the above 1.25 times are downright one example, and in case of (1) and (3) above, in principle, it is necessary to set as Vp1>Vp2.

Figure 7:
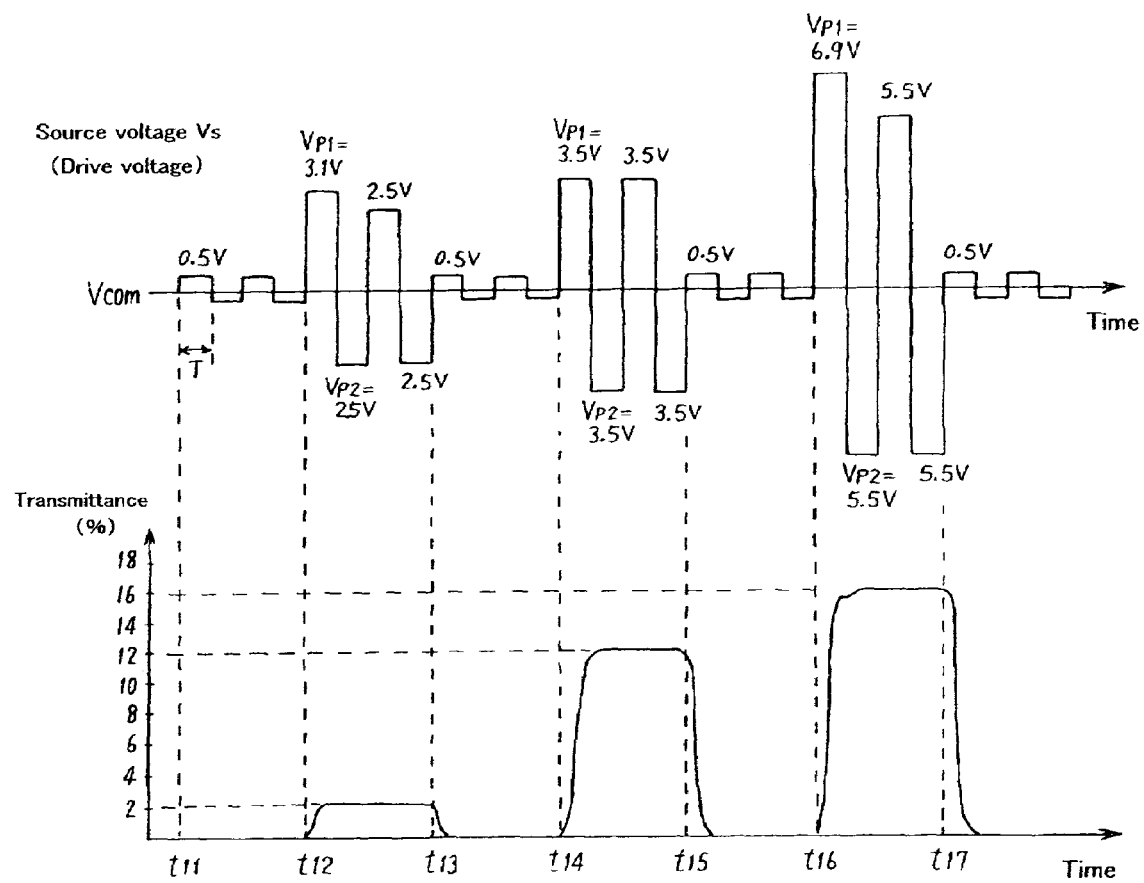
FIG. 7 is a response characteristic diagram (III) of transmittance of the MVA type liquid crystal panel according to the embodiment of the present invention.

FIG. 7 is a diagram showing the response characteristic of a preferable drive voltage and its transmittance according to the embodiment of the present invention when the display of a certain pixel is switched as black→low brightness halftone →black→high brightness halftone→black→white→black. The black state at the drive voltage 0.5V is displayed for 4-frame periods from time t11, and the low brightness halftone at the target drive voltage Vp2=2.5V is displayed for 4-frame periods from time t12. This case corresponds to the change from the first transmittance to the second transmittance, and as shown in FIG. 3C, the drive voltage in the first frame period starting from time t12 is set to Vp1=1.25×Vp2=3.1V, and the next second, third and forth frame periods are set as the target drive voltage Vp2=2.5V, thereby switching to the low brightness halftone of transmittance about 2% with superior responsiveness.

Next, the black state at the drive voltage 0.5V is displayed for 4-frame periods from time t13, and the high brightness halftone at the target drive voltage Vp2=3.5V is displayed for 4-frame periods from time t14. This case corresponds to the change from the first transmittance to the third transmittance, and as shown in FIG. 3B, the drive voltage in the first frame period starting from time t14 and in the next second, third and forth frame periods is set as Vp1=Vp2=3.5V, thereby switching to the high brightness halftone of transmittance about 12% without an overshoot Next, the black state at the drive voltage 0.5V is displayed for 4-frame periods from time t15, and the white state at the target drive voltage Vp2=5.5V is displayed for 4-frame periods from time t16. This case corresponds to the change from the first transmittance to the fourth transmittance, and as shown in FIG. 3C, the drive voltage in the first frame period starting from time t16 is set as Vp1=1.25×Vp2=6.9V, and the next second, third and fourth frame periods are set to the target drive voltage Vp2=5.5V, thereby switching to the white state of transmittance about 16% without the overshoot.

In this method, in the liquid crystal display device according to this embodiment, even in either case of switching from the black state to the low brightness halftone state, from the black state to the high brightness halftone state, and from the black state to the white state, the response time is shortened and also the switching is possible without generating the overshoot.

Figure 8:
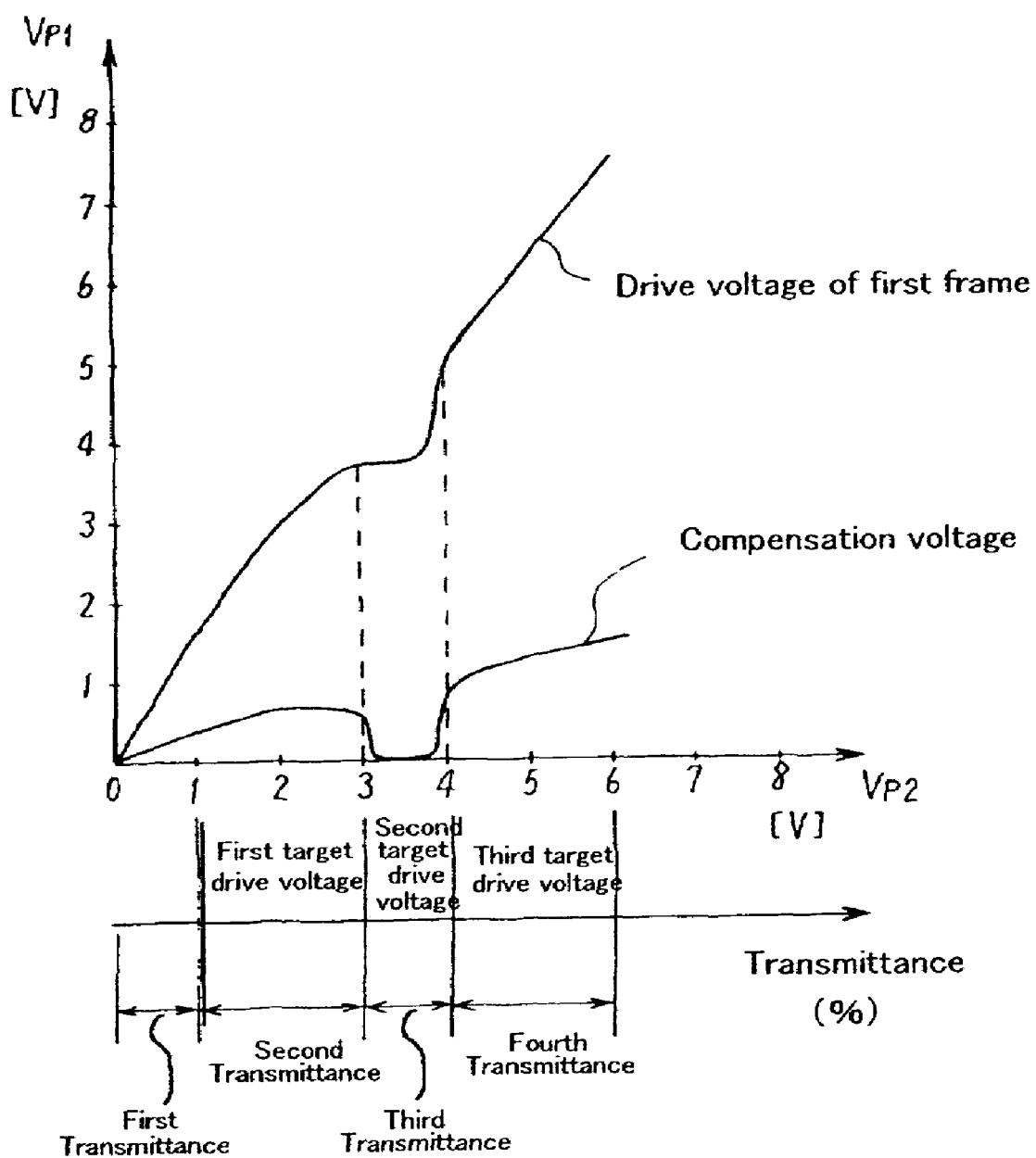
FIG. 8 is a relational diagram between a drive voltage and a compensation voltage according to the embodiment of the present invention.

FIG. 8 is a relational diagram between a drive voltage and a compensation voltage of the liquid crystal pixel according to the embodiment of the present invention. The target drive voltage Vp2 and transmittance were taken in the axis of abscissas, and the drive voltage Vp1 and the compensation voltage in the first frame period were taken in the axis of ordinates. Here, the compensation voltage is a difference voltage between the drive voltage Vp1 and the target drive voltage Vp2 in the first frame period.

As described above, according to this embodiment, when the first transmittance for the black state is switched to the second transmittance for the low brightness halftone state, the drive voltage Vp1 of the first frame period is set to be about 1.25 times the target drive voltage Vp2. Accordingly, the compensation voltage is set to be about 0.25 times the target drive voltage Vp2.

Furthermore, when the first transmittance is switched to the third transmittance for the high brightness halftone state, the drive voltage Vp1 of the first frame period is substantially equal to the target drive voltage Vp2. Accordingly, the compensation voltage is almost 0.

Furthermore, when the first transmittance is switched to the fourth transmittance for the white state, the drive voltage Vp1 of the first frame period is set to be about 1.25 times the target drive voltage Vp2. Accordingly, the compensation voltage is set to be about 0.25 times the target drive voltage Vp2.

Incidentally, in FIG. 8, specific numerical values of the first to third target drive voltages and values of the ratio of Vp1/Vp2 (1.25 times) can be different values according to a characteristic of the liquid crystal, use of the liquid crystal display device, or the like. Furthermore, the compensation voltage correspondingly becomes values depending on the characteristic of the liquid crystal, etc. Furthermore, each boundary of the first, second and third transmittances cannot always be clearly defined. Accordingly, their characteristic diagrams become smooth curves as shown in FIG. 8.

In the liquid crystal display device according to the embodiment of the present invention, as described later, a relationship between the target drive voltage Vp2 and the compensation voltage is stored as a table, and as the drive voltage plus the compensation voltage is applied on the liquid crystal pixel, when the display of each liquid crystal pixel is switched, the liquid crystal can be driven by the drive voltage having optimal characteristics of the response speed and the overshoot.

Figure 9:
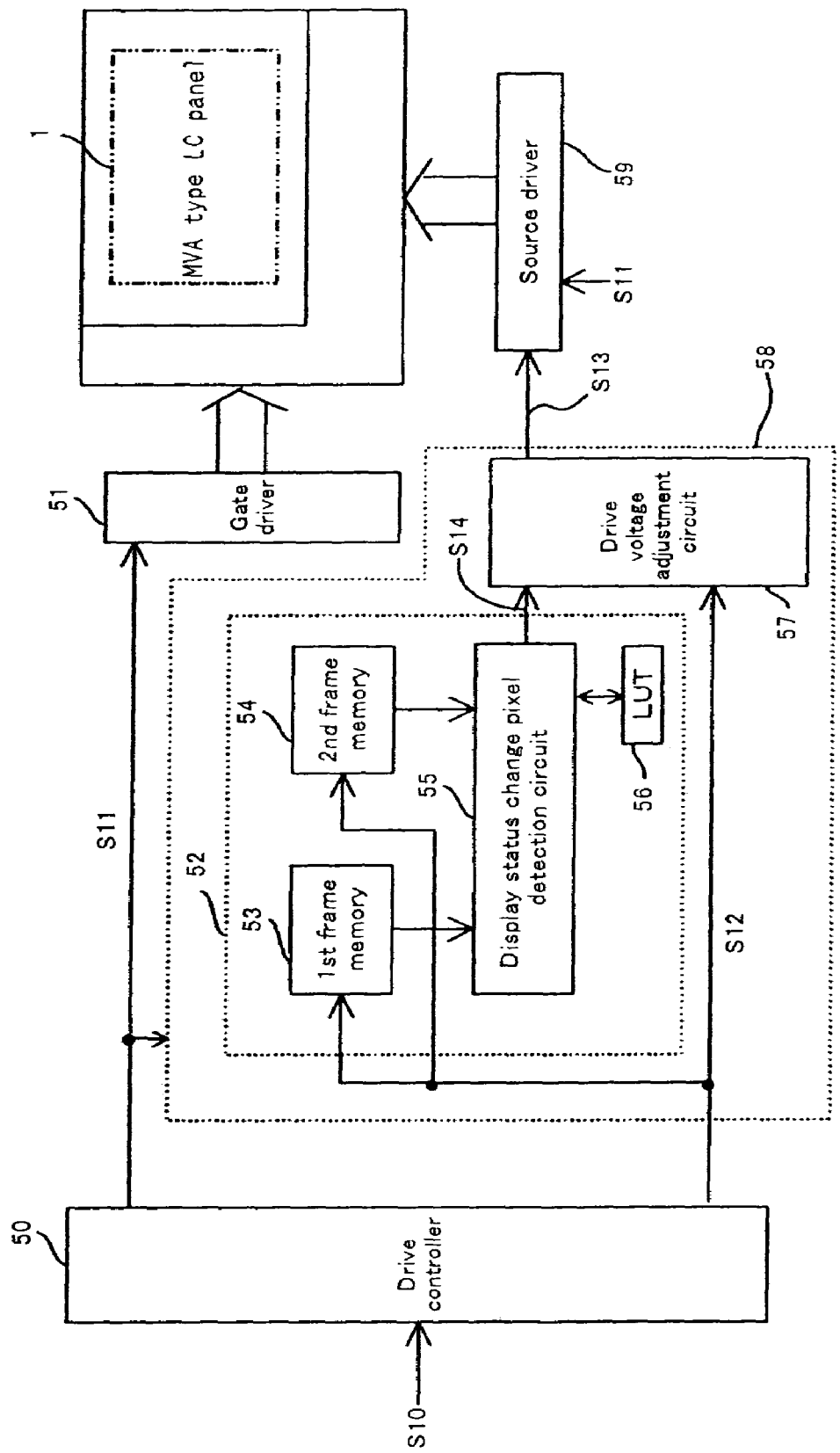
FIG. 9 is a schematic view of the entire of the liquid crystal display device according to the embodiment of the present invention.

FIG. 9 is a schematic view of the entire of the liquid crystal display device according to the embodiment of the present invention. The liquid crystal display device according to the embodiment comprises a MVA type liquid crystal panel 1; a drive control part 50 to which a video signal S10 is supplied; a gate driver part 51 to which a timing signal S11 is supplied from the drive control part 50, and which drives gate electrode lines of the MVA type liquid crystal panel 1; a compensation circuit 52 for generating a compensation voltage signal S14 of the drive voltage from a target drive signal S12 in correspondence with the target transmittance of the liquid crystal pixel; a drive voltage adjustment circuit 57 for generating a drive signal S13 of the liquid crystal pixel from the target drive signal S12 and the compensation voltage signal S14; and a source driver part 59 to which the drive signal S13 and the timing signal S11 are supplied, and which drives the source electrode line of the MVA type liquid crystal panel 1.

Furthermore, the compensation circuit 52 comprises primary and secondary frame memories 53, 54 for alternately storing the target drive signal S12 of each of the respective liquid crystal pixels of the MVA type liquid crystal panel 1 in each frame period; and a display status change pixel detection circuit 55 for comparing data of the primary frame memory 53 with data of the secondary frame memory 54, and detecting pixels of the changed display status, and outputting the compensation voltage signal S14 to a drive voltage adjustment circuit 57. In this case, the display status change pixel detection circuit 55 refers to a lookup table 56 storing relational data of the target drive voltage Vp2 and the compensation voltage when the display status is changed from a status of transmittance 0 shown in FIG. 8, and generates the compensation voltage signal S14.

Namely, the target drive signal S12 in correspondence with the transmittance of the pixels is output from the drive control part 50 in synchronism with the timing signal S11, and alternately stored in the primary and secondary frame memories 53, 54 in each frame period. In this case, for example, when the first transmittance of a certain pixel is stored in the primary frame memory 53 in the first frame period and the second transmittance of the pixel is stored in the secondary frame memory 54 in the second frame period, the pixel is switched from the first transmittance to the second transmittance. This switching of the pixel display is detected by the display status change pixel detection circuit 55, which generates the compensation voltage signal S14 based on data of the lookup table 56. This compensation voltage signal S14 is added to the target drive signal S12 in the drive voltage adjustment circuit 57, and is supplied to a source driver part 59 as the drive signal S13.

In this method, in the liquid crystal display device according to this embodiment, as the liquid crystal pixel is driven based on data of the lookup table 56 acquired from the response characteristic of the liquid crystal pixel, it is possible to optimize the characteristics of the response speed and the overshoot of the liquid crystal pixel. Furthermore, even when the liquid crystal pixel having the different response characteristic is driven, it is possible to realize the optimal response characteristic at all times only by changing the data of the lookup table 56.

Second Embodiment

Next, a liquid crystal display device according to another embodiment of the present invention in which, in displaying a black, a predetermined drive voltage is applied on liquid crystal molecules to be in advance inclined, so that a response time is lessened when the black state is switched to a halftone state, etc., will be explained.

As described above, as the liquid crystal molecules in the vicinity of a projection of a MVA type liquid crystal panel are aligned vertically to an inclined plane of the projection, the liquid crystal molecules have a slight inclined angle even in a state that a drive voltage is not applied. However, the inclination of the liquid crystal molecules in the vicinity of the projections only becomes a trigger which lets the other liquid crystal molecules incline sequentially when the drive voltage is applied, and the liquid crystal molecules away from the projections are aligned substantially vertically to a substrate in a state that the drive voltage is not applied.

In the liquid crystal display device according to this embodiment of the present invention, when a black is displayed in the MVA type liquid crystal panel, a predetermined drive voltage Voff is applied on the liquid crystal molecules to be in advance inclined, and the response time when the black state is switched to the halftone state, etc. is lessened.

Figure 10:
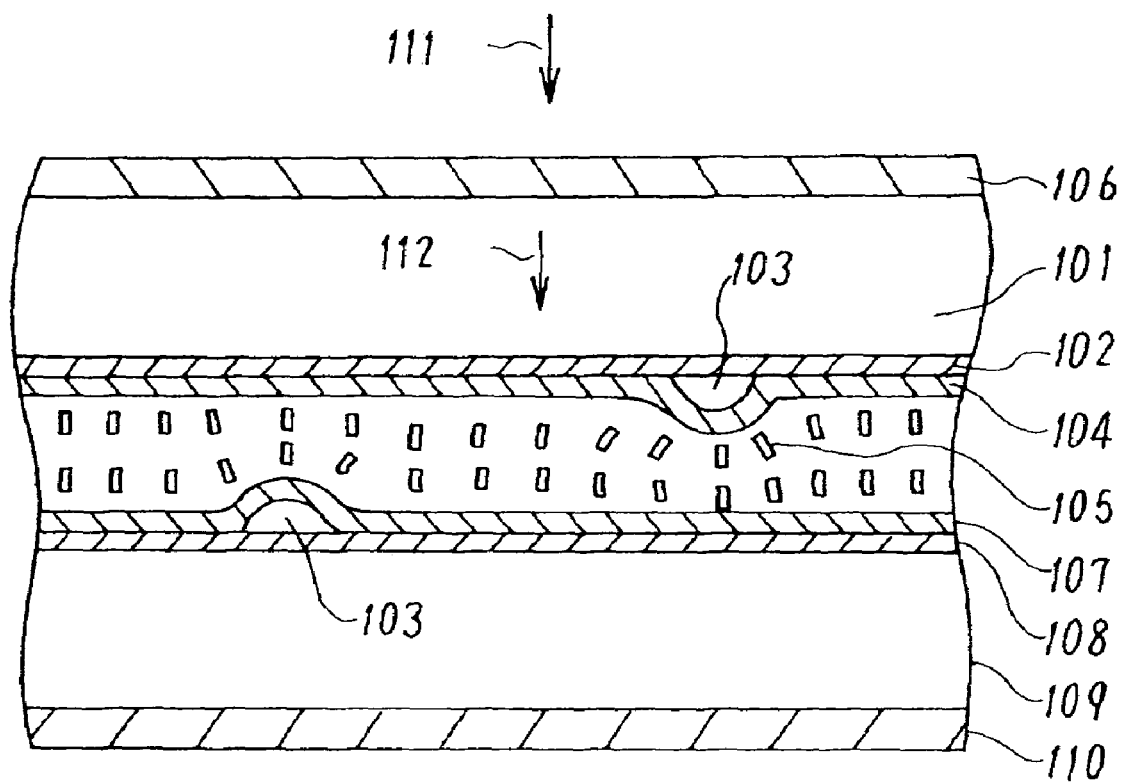
FIG. 10 is a cross-sectional view when a drive voltage is not applied to the MVA type liquid crystal panel according to the embodiment of the present invention.

FIG. 10 is a cross-sectional view when a drive voltage is not applied on the MVA type liquid crystal panel according to this embodiment. In the MVA type liquid crystal panel according to this embodiment, an electrode 102 of an ITO transparent conductive inter-film, etc., a bank-like structure 103 of a projection, etc., and a vertical alignment film 104 are laminated on a lower face of a substrate 101 of glass, etc., and a common electrode 108, the bank-like structure 103, and a vertical alignment film 107 are laminated on an upper face of a substrate 109 of glass, etc., and liquid crystal molecules 105 are sealed up therebetween, and further a polarization plate 106 is provided on the upper face of the substrate 101, and a polarization plate 110 is provided on the lower face of a substrate 109.

When the MVA type liquid crystal panel according to this embodiment is, for example, operated in a normally black mode with a transmission structure, a transmission axis of the polarization plate 106 is stationed so as to be perpendicular to the transmission axis of the polarization plate 110. In the MVA type liquid crystal panel, in a state that the drive voltage is not applied between the electrode 102 and the common electrode 108, as the liquid crystal molecule 105 is aligned substantially vertically to the substrate 101, etc., the liquid crystal molecule 105 does not have an optical characteristic of an optical rotation, etc. Accordingly, lights 112 which became a linear polarization by passing the polarization plate 106 cannot pass the polarization plate 110, so that a black state of transmittance 0 can be obtained.

On the other hand, when the drive voltage is applied between the electrode 102 and the common electrode 108, the inclination of the liquid crystal molecule 105 starts to have the optical characteristic, and the lights 112 slightly pass the polarization plate 110 to become the halftone state. When the drive voltage between the electrode 102 and the common electrode 108 is further increased, the liquid crystal molecule 105 is horizontalized to the substrate 101, etc, and a polarization plane of the lights 112 rotates at 90°, and the transmittance of the polarization plate 110 is maximized. This case is a white state.

Figure 11A:
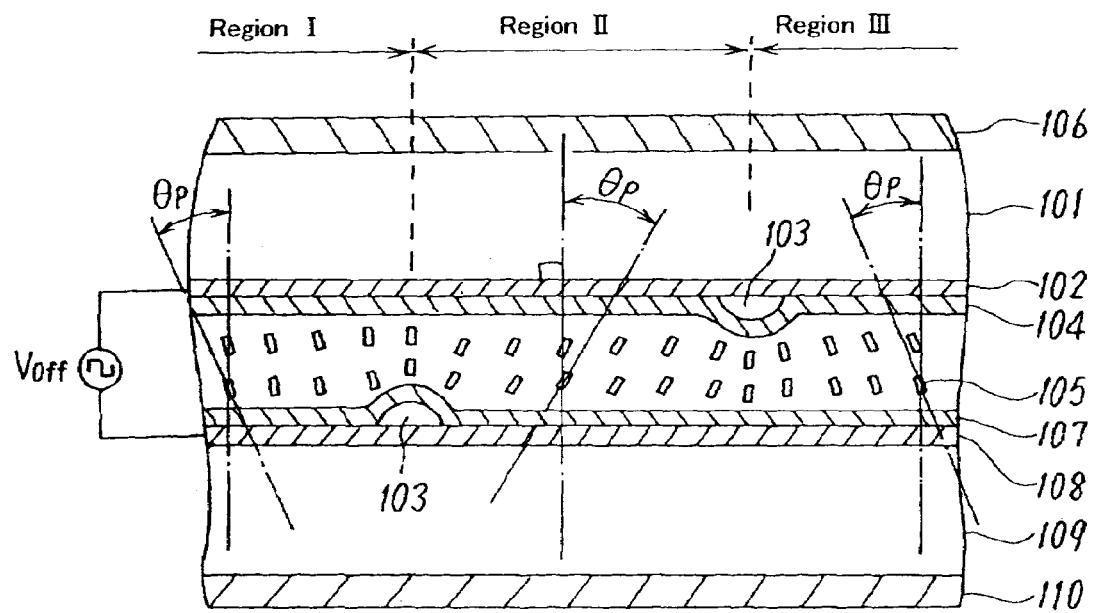
FIG. 11 is an explanatory view when the drive voltage is applied on the MVA type liquid crystal panel according to the embodiment of the present invention.
Figure 11B:
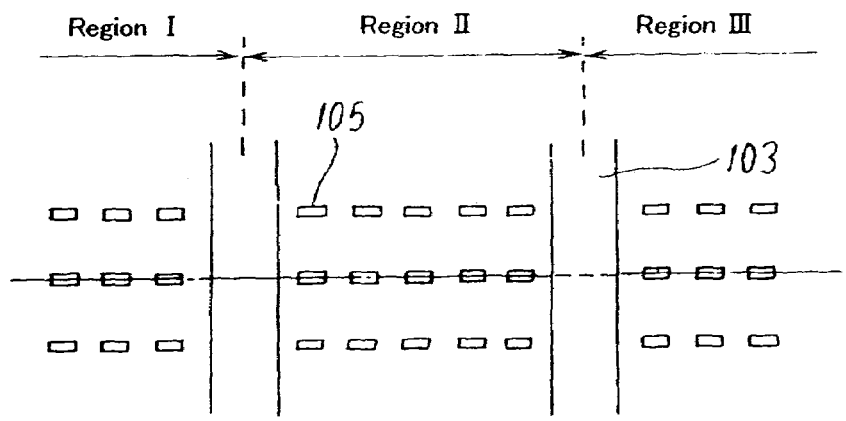

FIG. 11 is an explanatory view in which in a state that the drive voltage Voff is applied in the MVA type liquid crystal panel according to this embodiment of the present invention, a black is displayed. FIG. 11A is its cross-sectional view and FIG. 11B is its plane view. As shown in FIG. 11A, in the MVA type liquid crystal panel according to this embodiment, even when the black state is carried out, the drive voltage Voff is applied between the electrode 102 and the common electrode 108, and the liquid crystal molecule 105 is in advance inclined at only an angle θp from a direction vertical to the substrate 101, etc. Here, the drive voltage Voff is set to be greater than a threshold voltage Vth starting the inclination of the liquid crystal molecule 105, and also smaller than a value generating transmittance of the liquid crystal panel.

Incidentally, as shown in the plane view of FIG. 11B, the inclination direction of the liquid crystal molecule 105 is a direction vertical to the bank-like structure 103. Furthermore, since left and right inclinations of the bank-like structure 103 are different from each other, the liquid crystal molecules 105 are inclined leftward in a region I and a region III of the liquid crystal panel, and rightward in a region II thereof.

In this method, according to this embodiment, the drive voltage Voff displaying a black is set to be higher than the threshold voltage Vth, so that the liquid crystal molecules 105 in the black state are inclined at only the angle θp. Accordingly, when the black state is switched to the halftone state, the liquid crystal molecules 105 can be inclined in a short time up to an angle corresponding to the halftone state, and the response time of the display can be lessened.

Figure 12:
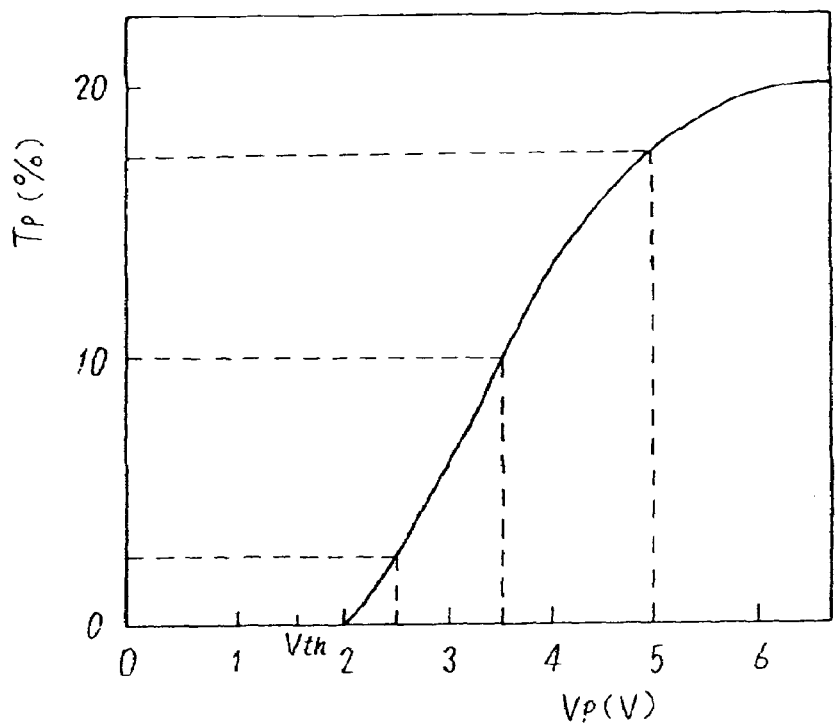
FIG. 12 is a diagram showing a relationship between the drive voltage and the panel transmittance.

FIG. 12 is a diagram showing a relationship between the drive voltage Vp of the liquid crystal molecule 105 and the transmittance Tp of the liquid crystal panel. When the drive voltage Vp is incrementally increased from 0, as describe above, the inclination of the liquid crystal molecule 105 starts at the threshold voltage Vth. However, even if the drive voltage Vp exceeds the threshold voltage Vth, the inclination of the liquid crystal molecule 105 is still small, and the transmittance Tp is substantially 0. The display is still a black.

When the drive voltage Vp exceeds 2V, the transmittance Tp incrementally increases, and the transmittance Tp becomes about 2% at the drive voltage Vp about 2.5V, thereby reaching the low brightness halftone state. Furthermore, when the drive voltage Vp is about 3.5V, the transmittance Tp becomes about 10%, thereby reaching the high brightness halftone state, and when the drive voltage Vp is about 5V, the transmittance Tp becomes about 15% or more, thereby reaching the white state.

In this method, as the MVA type liquid crystal panel according to this embodiment has a region where the transmittance Tp is 0 even at the threshold voltage Vth or more starting the inclination of the liquid crystal molecule 105, the drive voltage Voff displaying a black can be set to be greater than the threshold voltage Vth, for example, 2V, whereby even in the black state, the liquid crystal molecule 105 can be inclined in advance at only the angle θp. Accordingly, when the black state is switched to the halftone state, etc., the liquid crystal molecule 105 can be inclined in a short time up to an angle corresponding to the halftone state, etc., and the response time of the display can be shortened.

Figure 13:
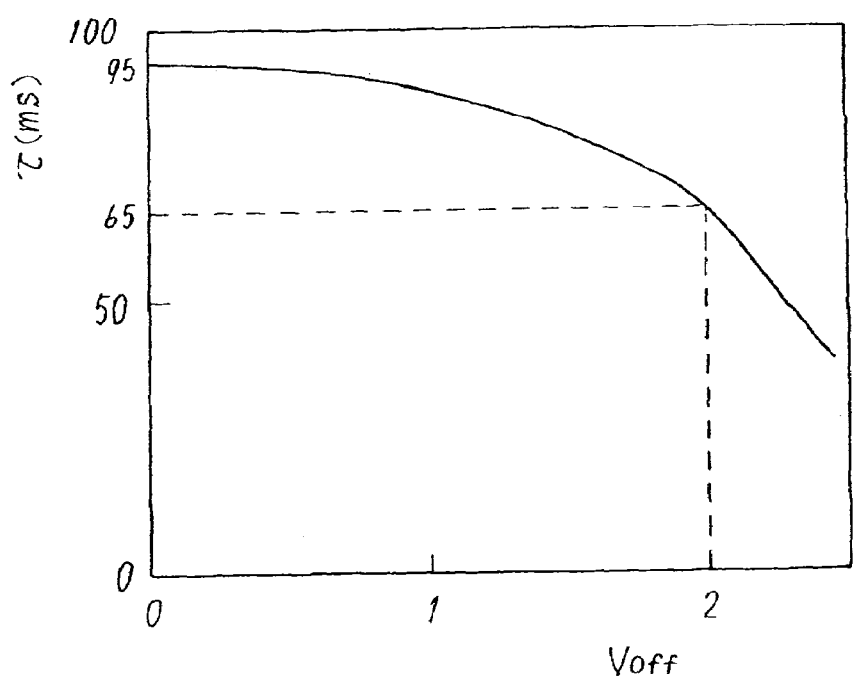
FIG. 13 is a relationship between the drive voltage Voff and a response time to a halftone.

FIG. 13 is a diagram showing a relationship between the drive voltage Voff and a response time τ to a halftone when a state that the drive voltage Voff is applied to display a black is switched to the halftone state at the drive voltage Vp=2.5V. As shown in FIG. 13, the response time τ in case of the drive voltage Voff=0 is about 95 ms, but if the drive voltage Voff=2V, the response time τ is reduced to about 65 ms.

In this method, the higher the drive voltage Voff displaying a black, the faster the response time when the black state is switched to the halftone state. In this case, as shown in FIG. 12, since the transmittance Tp of the liquid crystal panel is 0 until the drive voltage Voff reaches about 2V, the drive voltage Voff is set to be about 2V, thereby shortening only the response time without lowering display contrast of the liquid crystal panel.

Incidentally, the MVA type liquid crystal panel according to this embodiment is shown as an example of using the bank-like structure 103 for the purpose of determining the inclination direction of the liquid crystal molecule 105 in FIG. 11. The present invention is applicable to the whole of VA type liquid crystal panels such as a display panel which uses a slit-like electrode in order to determine the inclination direction of the liquid crystal molecule 105, a display panel which uses a rubbed vertical alignment film, or the like.

Figure 14:
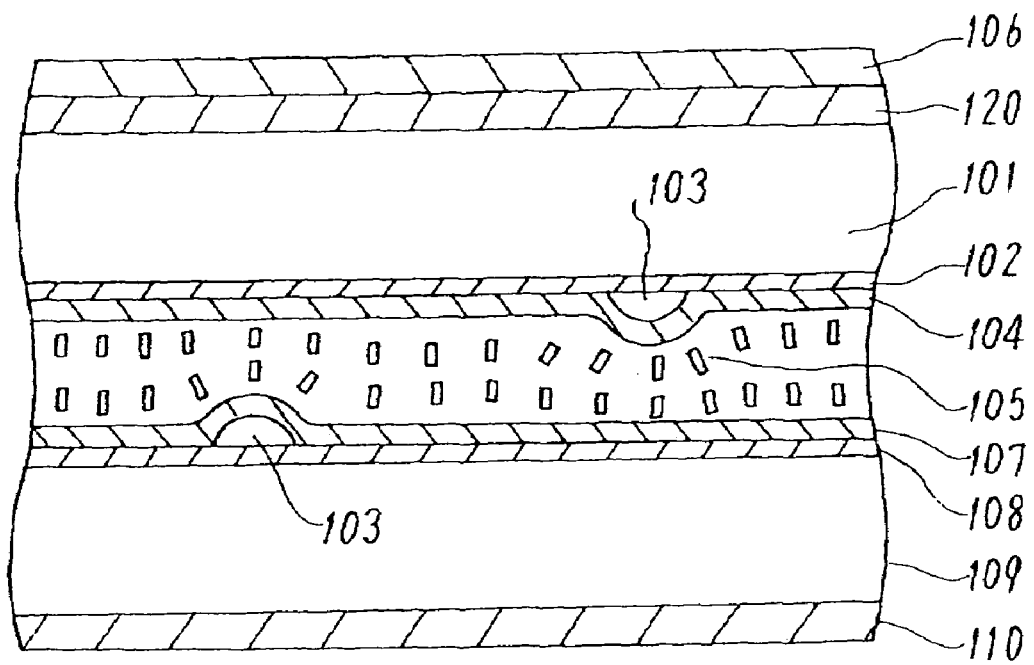
FIG. 14 is a cross-sectional view of the MVA type liquid crystal panel according to the embodiment of the present invention.

FIG. 14 is a cross-sectional view of the MVA type liquid crystal panel according to the another embodiment of the present invention. In this embodiment, the further greater drive voltage Voff is applied in a black state, and an inclination angle of the liquid crystal molecules is increased, and the response time when the black state is switched to the halftone state is further lessened.

This embodiment differs from the embodiment of FIG. 10 in that an optical characteristic compensating linear phaser film 120 is provided between the transparent substrate 101 of glass, etc. and the polarization plate 106. Since the linear phaser film 120 has an optical characteristic reverse to that of the liquid crystal, the linear phaser film 120 can cancel the optical characteristic of the liquid crystal.

Namely, even if the greater drive voltage Voff is applied and the inclination angle Op of the liquid crystal molecule is increased, the linear phaser film 120 can cancel the optical characteristic of the liquid crystal. Therefore, in the MVA type liquid crystal panel laminating the linear phaser film 120, the inclination angle θp of the liquid crystal molecule in the black state can be increased, and the response time from the black state to the halftone state can be more lessened.

Figure 15:
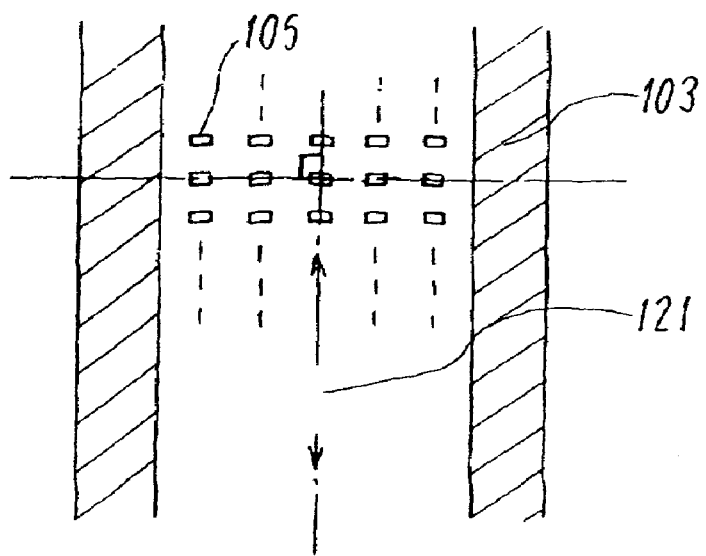
FIG. 15 is a top view of the MVA type liquid crystal panel of FIG. 14.

In order to cancel the optical characteristic of the liquid crystal by lamination of the linear phaser film 120, the linear phaser film 120 in which an optical phase difference Δnd is about 10 nm is stationed so that the delay phase axis 121 is vertical to a delay phase axis (inclination direction) of the liquid crystal molecule 105 as shown in FIG. 15, namely in parallel to the bank-like structure 103. This station causes the optical characteristic in the linear phaser film 120 reverse to that of the liquid crystal, and can cancel the optical characteristic of the liquid crystal.

Figure 16:
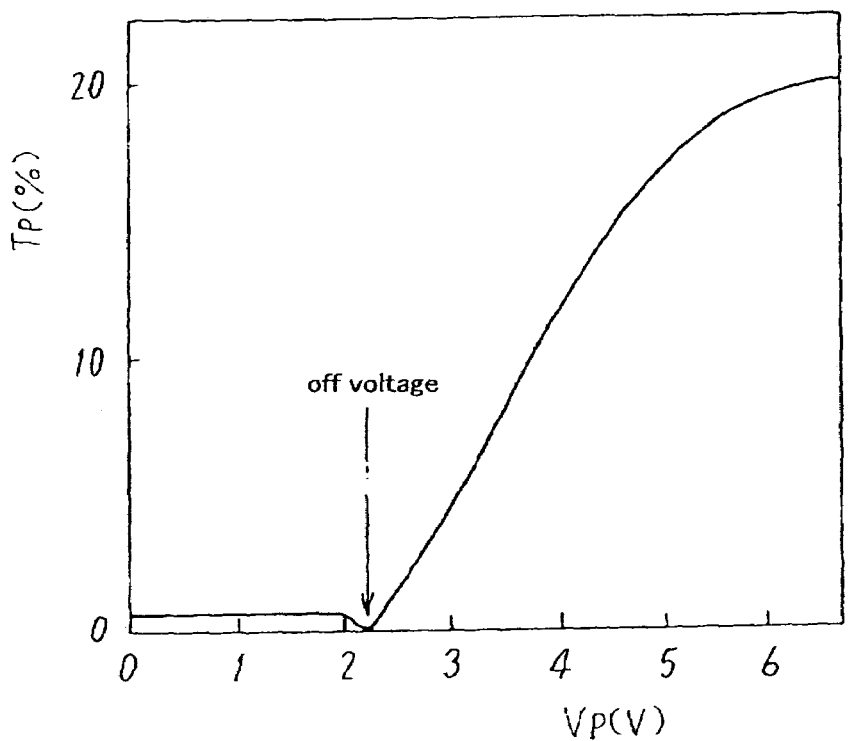
FIG. 16 is a diagram showing a relationship between the drive voltage and the panel transmittance after lamination of a retardation film.

FIG. 16 is a diagram showing a relationship between the drive voltage Vp and the transmittance Tp of the MVA type liquid crystal panel in which the linear phaser film 120 is laminated. The characteristic of the drive voltage about 2V or more of FIG. 16 is equivalent to one in which the characteristic of the transmittance of FIG. 12 not laminating the linear phaser film is shifted in parallel downward by only the transmittance relevant to the optical characteristic of the linear phaser film 120. Incidentally, in FIG. 16, the transmittance Tp is not 0 while the drive voltage Vp is 0V to 2V, and this is because the inverse optical characteristic is generated by lamination of the linear phaser film 120.

In the MVA type liquid crystal panel according to this embodiment, as shown in FIG. 16, since the drive voltage Vp for setting the transmittance Tp to 0 is 2V or more, the high drive voltage Voff of 2V or more can be applied in the black state. Accordingly, the inclination angle of the liquid crystal molecule can be increased in correspondence with the high drive voltage Voff of 2V or more, and the response time from the black state to the halftone state can be more diminished. Incidentally, when the optical phase difference Δnd of about 10 nm is provided to a visual angle compensating phase difference film usually used in the MVA type liquid crystal panel, the same effect can be realized.

In case where the linear phaser films 120 are laminated, when the alignment directions of the liquid crystal molecules 105 differ according to the region of the display panel, it is necessary that the delay phase axis 121 of the linear phaser film 120 is perpendicular to the delay phase axis (inclination direction) of the liquid crystal molecule 105 in each region. In this case, it is preferable that the linear phaser film 120 is formed inside the display panel, and is brought as near as possible in proximity to the bank-like structure 13 and the liquid crystal layer, and therefore a parallax of each region is lessened.

Figure 17:
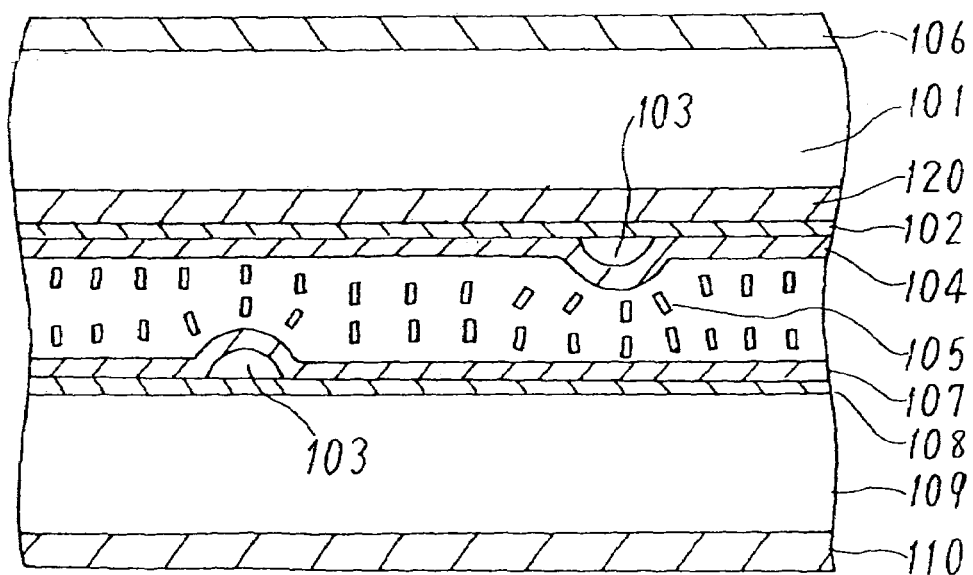
FIG. 17 is a cross-sectional view of the MVA type liquid crystal panel according to the embodiment of the present invention.

FIG. 17 is a cross-sectional view of the MVA type liquid crystal panel in which the optical characteristic compensating linear phaser film 120 is formed inside the display panel according to the another embodiment of the present invention. According to this embodiment, as the linear phaser film 120 is formed on the lower face of the substrate 101 of glass, etc., and is near to the bank-like structure 103 and the liquid crystal layer, the parallax of each region can be reduced.

Figure 18:
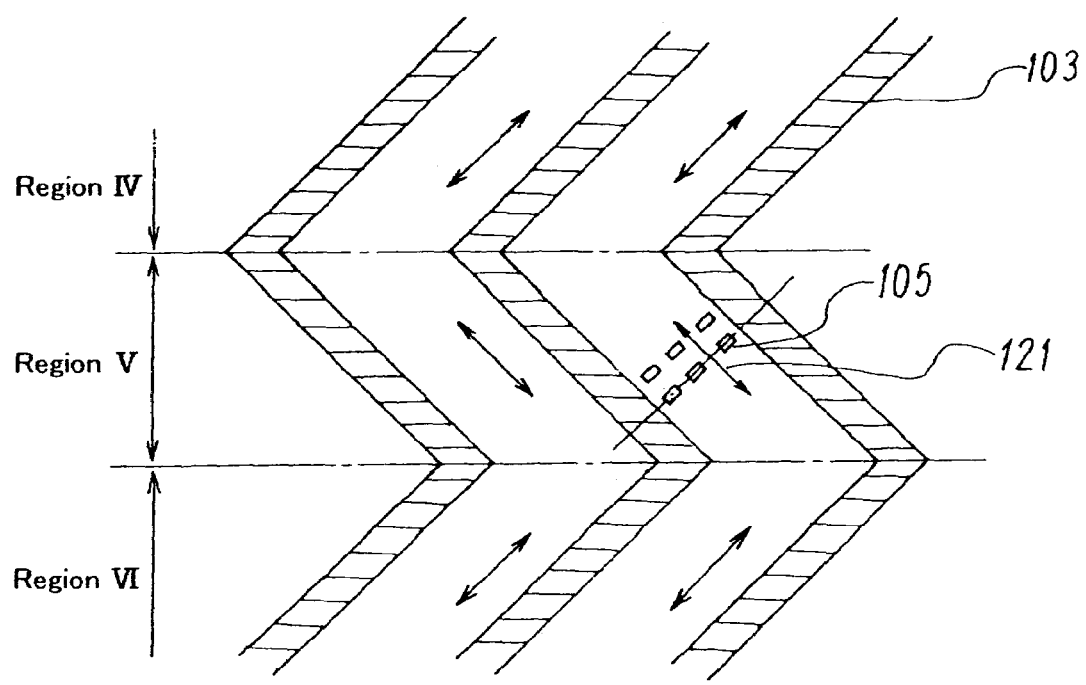
FIG. 18 is a top view of the MVA type liquid crystal panel of FIG. 17.

FIG. 18 is a top view of the MVA type liquid crystal panel according to the another embodiment of FIG. 17. According to this embodiment, as the bank-like structure 103 is formed zigzag, the alignment directions of the liquid crystal molecules 105 also become vertical to the bank-like structure 103 in each of the regions IV, V and VI to be zigzag. Accordingly, the delay phase axis 121 of the linear phaser film 120 is stationed in a direction perpendicular to the delay phase axis (inclination direction) of the liquid crystal molecule 105 in each of the regions IV, V and VI, namely in parallel to the bank-like structure 103.

In this method, according to this embodiment, as the delay phase axis 121 of the linear phaser film 120 in each of the respective regions is stationed perpendicular to the delay phase axis (inclination direction) of the liquid crystal molecule 105, the optical characteristic of the liquid crystal can be cancelled by the linear phaser film 120, and it becomes possible to apply the high drive voltage Voff in the black state. For this reason, the inclination angle Op of the liquid crystal molecule in the black state is increased, and the response time from the black state to the halftone state can be shortened.

Third Embodiment

Next, an explanation will be for a liquid crystal display device in which a response time is shortened when a black state is switched to a halftone state, etc., and a liquid crystal display device which reduces an overshoot of a brightness to be generated when the display is switched.

According to the first embodiment above, when the black state is switched to the halftone state, etc., for example, the black state of one frame just before switching to the halftone state is detected, and a drive voltage of a liquid crystal is adjusted by the detection results. However, since a response characteristic from the black state to the halftone state, etc. is affected by not only the black state of the just preceding one frame, but also the display of the frame further before the just preceding frame, a suitable drive cannot be made by detecting only the black state of the just preceding frame, and there may be a case where an overshoot is generated in a brightness.

Then, in the liquid crystal display device according to this embodiment, when the black state is switched to the halftone state, etc., the black states of the just preceding frame and the further prior frame are detected, and a suitable drive voltage is applied, so that the over shoot of the brightness is decreased.

Figure 19:
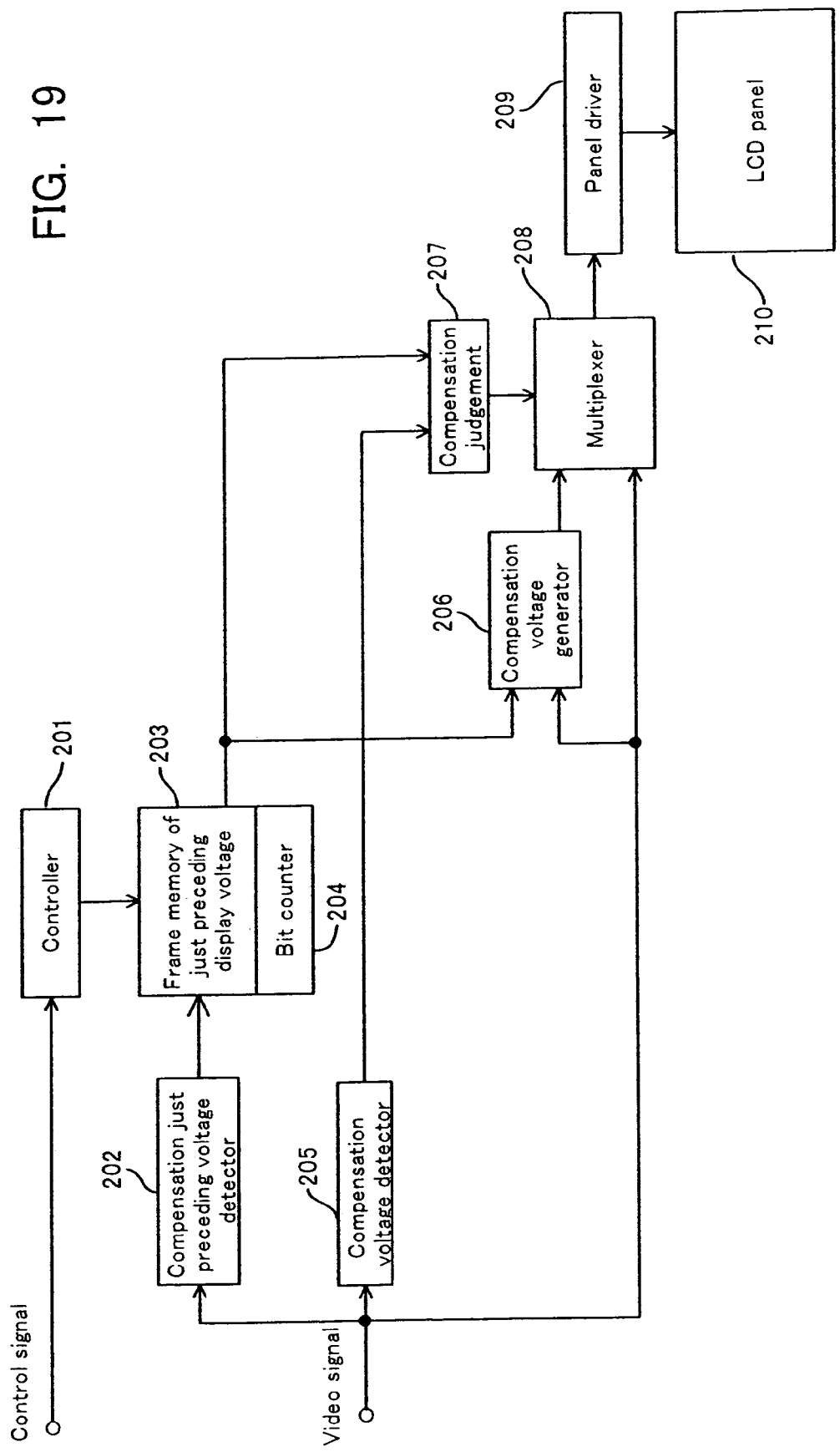
FIG. 19 is a structural view of the liquid crystal display device according to the embodiment of the present invention.

FIG. 19 is a structural view of the liquid crystal display device according to the embodiment of the present invention. The liquid crystal display device according to this embodiment comprises a compensation voltage detection circuit 205 for detecting a drive voltage to be compensated from a video signal; a compensation just preceding voltage detection circuit 202 for detecting the drive voltage one frame before the drive voltage to be compensated; and a just preceding display voltage frame memory 203 for storing the drive voltage detected by the compensation just preceding voltage detection circuit 202, and the just preceding display voltage frame memory 203 has a bit counter 204 for counting the number of frames when each pixel has the same drive voltage in the continuous frame. Incidentally, a control signal for setting a threshold, etc. of a detection voltage is input from a control circuit 201 to the just preceding display voltage frame memory 203. The frame memory 203 and the bit counter 204 have regions and counters for the pixels, respectively.

Furthermore, the liquid crystal display device according to this embodiment comprises a compensation voltage generation circuit 206 for generating a compensation voltage to be added to the drive voltage; a compensation judgement circuit 207 for judging whether or not compensation is made from the drive voltage to be compensated and the just preceding drive voltage; a multiplexer 208 for adding the compensation voltage signal to the video signal; a panel drive circuit 209 for driving a liquid crystal display panel 210 according to an output signal of the multiplexer 208; and the liquid crystal display panel 210.

In the liquid crystal display device according to this embodiment, for example, when the response characteristic is compensated when switching from the continuous black state to the halftone state, etc., the drive voltage of the black state in the frame just before the compensating halftone state frame is detected by the compensation just preceding voltage detection circuit 202, and the drive voltage is stored in the just preceding display voltage frame memory 203.

When it is detected by the bit counter 204 that the black state just before the compensating halftone state frame continues in the predetermined number of frames, and the compensating halftone drive voltage is detected by the compensation voltage detection circuit 205, the compensation voltage is added to the drive voltage by the multiplexer 208 An alignment state of the liquid crystal molecules displaying a black is not necessarily in the initial state at all times, but differs depending on the drive voltage of the preceding frame. However, if the black state continues, for example, in two frames, the alignment state of the liquid crystal molecules becomes substantially an initial state irrespective of the drive voltage of the preceding frame. For this reason, since a state change of the liquid crystal molecules is constant when the black state is switched to the halftone state in this case, the optimal compensation voltage can always be added to the drive voltage for displaying the halftone. Accordingly, the response time is reduced for changing-the black state to the halftone state, and also the overshoot of the brightness can be prevented.

FIG. 20 is an explanatory view showing a compensation principle of a drive method according to this embodiment. FIG. 20A is waveforms of the drive voltage and transmittance in the case of non-compensation. Here, the axis of abscissas is a time, and scales are entered in each of a 1-frame period T. Incidentally, the drive voltage is actually inverted in each of the 1-frame period and applied to liquid crystal molecules, but for conveniences of description of the response characteristic, it is denoted as absolute values.

When the compensation according to this embodiment is not made, as shown in FIG. 20A, even if a drive voltage Vp2 displaying a halftone in time 0 is applied, transmittance does not rise immediately, and reaches target transmittance Tp2 in time 2T and on.

FIG. 20B is a waveform when the drive voltage Vp1 greater than Vp2 is applied in only the first frame period starting from time 0 in order to obtain the optimal drive voltage. In this case, the transmittance rises from time 0, and reaches transmittance Tp1 of a peak in time T, and thereafter falls to be 0 in time 2T. According to this embodiment, the drive voltage Vp1 in which the transmittance Tp1 of a peak of FIG. 20B is equal to a target transmittance Tp2 of FIG. 20A is used as the drive voltage of the first frame. This is shown in FIG. 20C.

FIG. 20C is a waveform when the compensation of the response characteristic was made by the drive method according to this embodiment. According to this embodiment, the frames of the black state continue (−3T, −2T, −T), and also when the black state is switched to the halftone state in time 0, the compensation of the drive voltage is made. FIG. 20C is the case where the black state continues in a 2-frame period of a −2 frame (−2T) and a −1 frame (−T), and also the target drive voltage Vp2 corresponds to the halftone in time 0, and the drive voltage Vp1 greater than the target drive voltage Vp2 is applied in the first frame period (0 to T). According to the drive method of this embodiment, it is possible to reach the target transmittance Tp1=Tp2 in a 1-frame period without generating the overshoot.

Next, when the drive voltage of the first frame (0 to T) is established by the above drive method of the first embodiment, the description will be made that the overshoot is generated in the transmittance Tp1 of the first frame (0 to T) due to influences of the −2 frame (−2T to −T).

Figure 21:
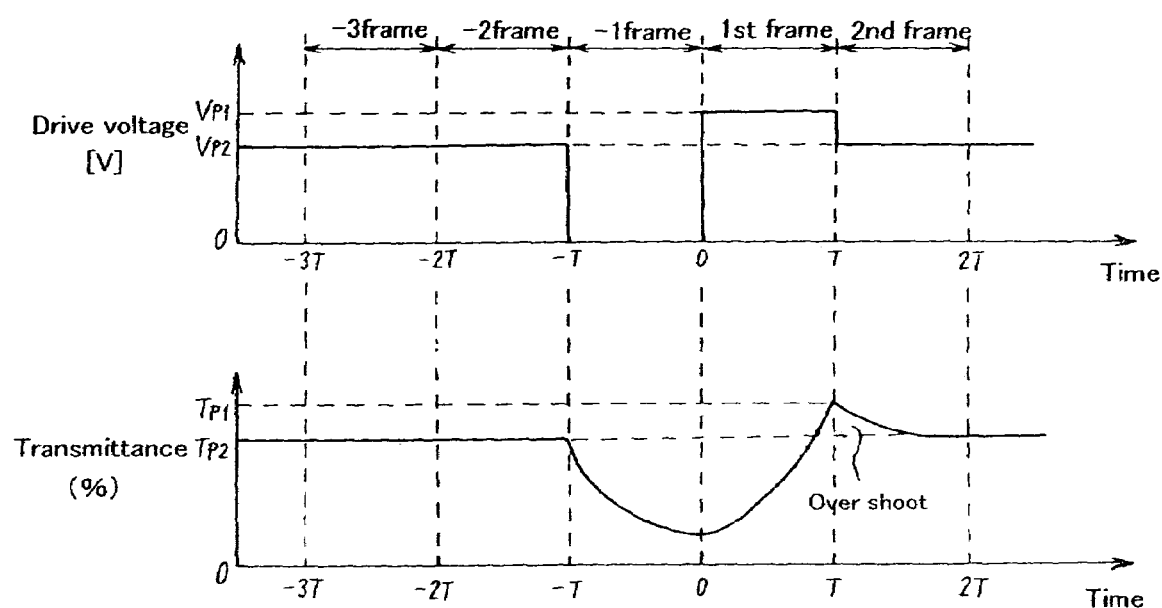
FIG. 21 is a waveform diagram when an overshoot generates a first frame under influences of a −2 frame.

As shown in FIG. 21, when the −2 frame (−2T to −T) is the halftone state and the drive voltage is Vp2, even if the drive voltage of the −1 frame (−T to 0) is 0, as the compensation voltage Vp1 is applied, the overshoot may generate in the transmittance Tp1 of the first frame (0 to T). This is because the inclination angle of the liquid crystal molecules inclined in the −2 frame (−2T to −T) is not returned fully to an initial state in the −1 frame (−T to 0). As is understood from FIG. 21, in addition to the just preceding frame, in correspondence with the drive voltage of the −2 frame period before that, it is preferable to be judged whether or not the compensation voltage is applied.

Figure 22:
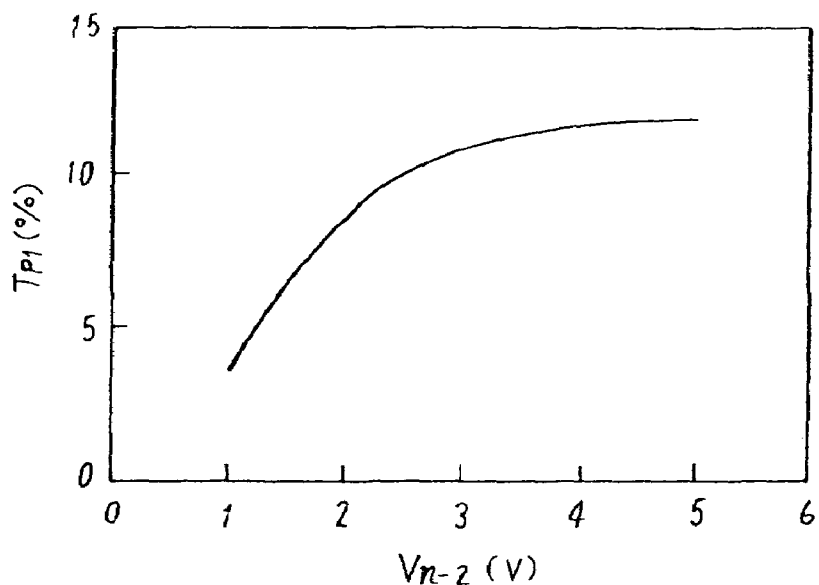
FIG. 22 is a diagram showing a relationship between a drive voltage Vn-2 of the −2 frame and maximum transmittance Tp1 of the first frame.

FIG. 22 is a diagram showing a relationship between a drive voltage Vn-2 of the −2 frame (−2T to −T) and maximum transmittance Tp1 of the first frame (0 to T) when the drive voltage Vn-1 of the −1 frame (−T to 0) is, for example, IV. As shown in FIG. 22, when the drive voltage Vn-2 of the −2 frame (−2T to −T) changes, the maximum transmittance Tp1 of the first frame (0 to T) changes largely. Accordingly, according to this embodiment, not only the drive voltage Vn-1 of the just prior −1 frame (−T to 0), but also the drive voltage Vn-2 of the further prior −2 frame (−2T to −T) are detected, and the drive voltage Vp1 of the first frame (0 to T) is determined. Namely, when the black state, etc. continues in the just preceding 2-frame period, the drive voltage Vp1 of the first frame (0 to T) is established.

Figure 23:
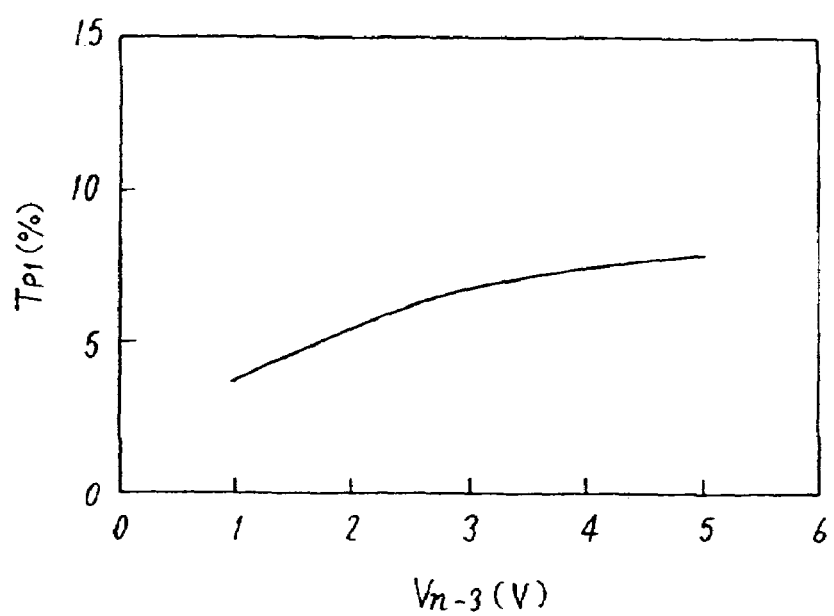
FIG. 23 is a diagram showing a relationship between a drive voltage Vn-3 of a −3 frame and the maximum transmittance Tp1 of the first frame.

FIG. 23 is a diagram showing a relationship between the drive voltage Vn-3 of a −3 frame and the maximum transmittance Tp1 of the first frame (0 to T) under the same conditions of FIG. 22 As shown in FIG. 23, the drive voltage Vn-3 of the −3 frame (−3T to −2T) is smaller in influences exerted on the maximum transmittance Tp1 of the first frame (0 to T) than the case of the drive voltage Vn-2 of the −2 frame (−2T to −T) shown in FIG. 22. Accordingly, according to this embodiment, only when the same drive voltage continues in the 2-frame period, the drive voltage of the first frame (0 to T) is set to be Vp1, whereby the change of transmittance of the first frame (0 to T) is optimized.

In this method, in the liquid crystal display device according to this embodiment, when the black state continues in the 2-frame periods and also the black state is switched to the halftone state after that, the drive voltage Vp1 greater than the target drive voltage Vp2 is applied on the first frame period (0 to T) displaying the halftone. For this reason, in the state change when the liquid crystal molecules are switched from the black state to the halftone state, the change is made from almost an initial state and the overshoot of the brightness can be prevented.

Incidentally, in the MVA type liquid crystal panel, since when the drive voltage is applied, the inclination alignment of the liquid crystal molecules is spread from a bank-like structure, only part of pixels responds in the 1-frame period, and a bound may generate in the second frame (T to 2T) as shown by a dotted line in FIG. 20C. In the case, the drive voltage Vp1 is continuously applied in the first and second frames (0 to T, T to 2T), thereby reducing the bound.

Figure 24:
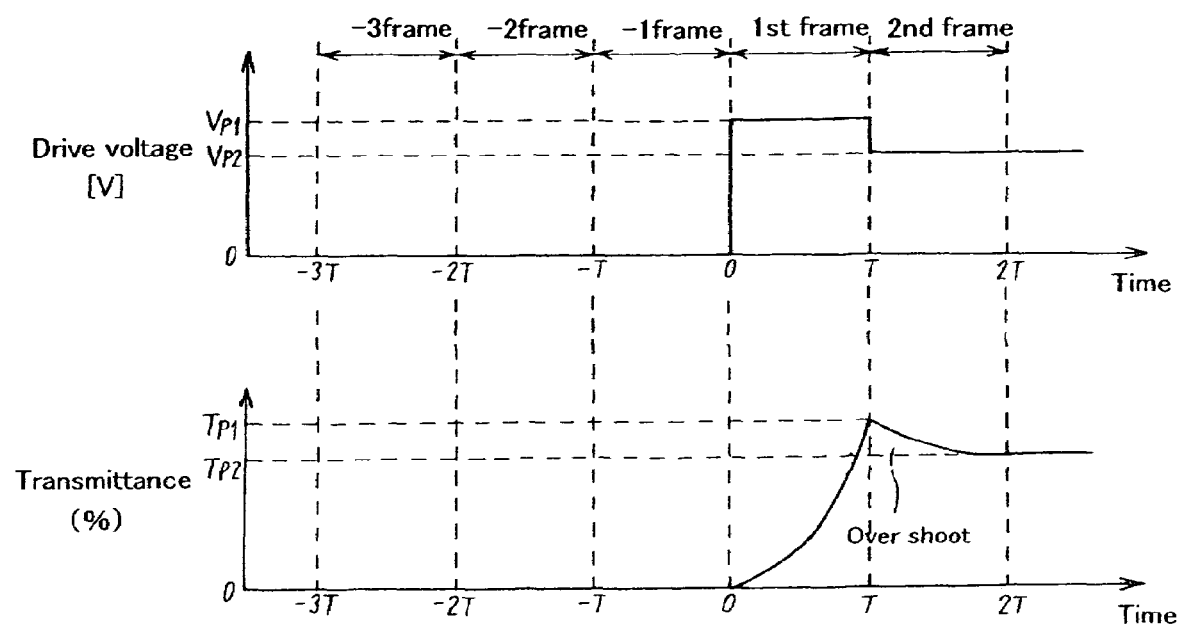
FIG. 24 is a wave form diagram when the overshoot generates when temperatures rise.

Next, the description will be made that when temperature of the liquid crystal panel increases, the overshoot is generated in the transmittance of the liquid crystal panel FIG. 24 is a waveform diagram of the drive voltage and the transmittance when temperatures of the liquid crystal panel rise. As shown in FIG. 24, according to the drive method of this embodiment, even when the drive voltage Vp1 is applied in the first frame period (0 to T), as the response of the liquid crystal is accelerated by an increase in the temperatures, the overshoot may be generated in the transmittance of the first frame (0 to T).

Figure 25:
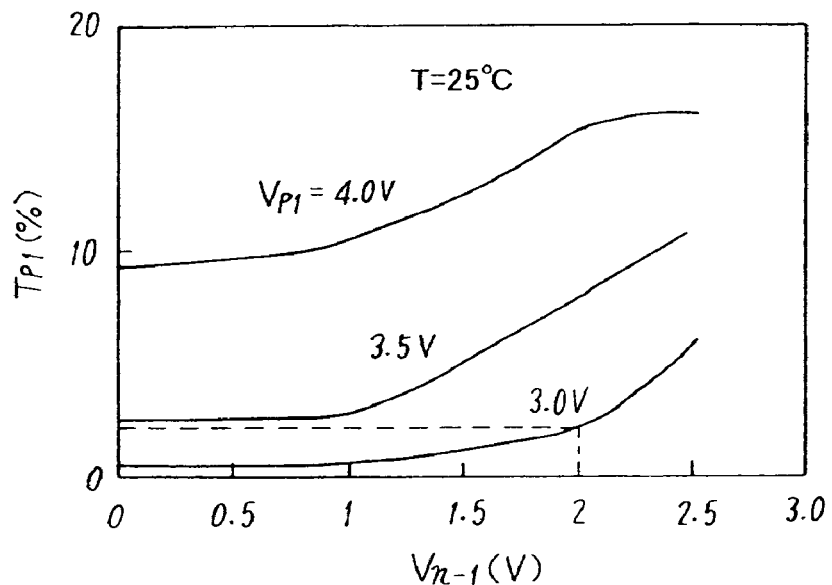

FIG. 25 shows a change of the maximum transmittance Tp1 of the first frame (0 to T) when temperatures of the display panel are 25° C., the drive voltage Vp1 of the first frame is 4.0V, 3.5V and 3.0V, and also when the drive voltage Vn-1 of the −1 frame (−T to 0) changes. As shown in FIG. 25, when the drive voltage Vp1 of the first frame (0 to T) is 3.0V, if the drive voltage Vn-1 of the −1 frame (−T to 0) changes from 0V to 2V, the maximum transmittance Tp1 of the first frame (0 to T) changes from about 0% to 2%.

Figure 26:
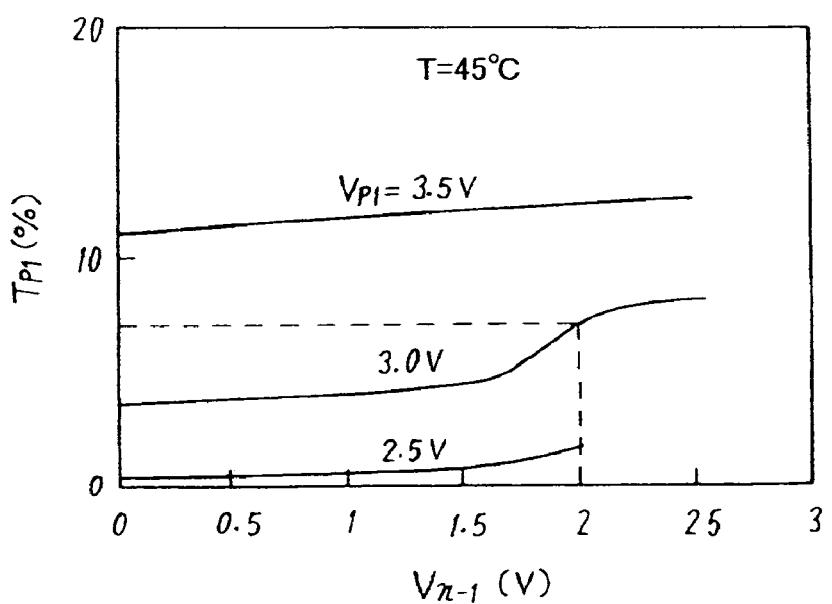
FIG. 26 is a diagram showing a relationship between the maximum transmittance Tp1 of the first frame and the drive voltage Vn-1 shortly before that at 45° C.

FIG. 26 shows the maximum transmittance Tp1 of the first frame (0 to T) when temperatures of the display panel are 45° C. under the same conditions as FIG. 25. As shown in FIG. 26, when the drive voltage Vp1 of the first frame (0 to T) is 3.0V, if the drive voltage Vn-1 of the −1 frame (−T to 0) changes from 0V to 2V, the maximum transmittance Tp1 of the first frame (0 to T) changes from about 3% to 7%. In this method, when the temperatures of the liquid crystal panel increase, the transmittance of the liquid crystal panel increases, and when the compensation voltage Vp1 is applied as shown in FIG. 24, the overshoot is generated in the transmittance, and the accurate brightness cannot be displayed.

Then, in the liquid crystal display device according to this embodiment, in the compensation voltage generation circuit 206 shown in FIG. 19, when the temperatures rise, a temperature compensation is made so as to lower the drive voltage Vp1 of the first frame (0 to T), and this prevents the generation of the overshoot in the transmittance of the display panel. Namely, in FIG. 20C, when the temperatures of the panel rise, the drive voltage Vp1 of the first frame (0 to T) is set to be lower as shown by a broken line.

Furthermore, as shown in FIGS. 25 and 26, when the drive voltage Vn-1 of the −1 frame (−T to 0) changes, the maximum transmittance Tp1 of the first frame (0 to T) also changes, and as shown in FIG. 12, if the drive voltage is 2V or less, the transmittance of the display panel is substantially 0. Accordingly, according this embodiment, when the black state is carried out in pixels, the maximum drive voltage is applied on a pixel electrode in the range of displaying a black. Namely, all the drive voltages Vn-1 of 2V or less is summarized to 2V, whereby the calculation of the drive voltage Vp1 of the first frame (0 to T) by the drive voltage Vn-1 of the just preceding display frame (−T to 0) is simplified, thereby decreasing a process load of a drive circuit. Furthermore, when the drive voltage Vn-1 of the −1 frame (−T to 0) is high, as the liquid crystal molecules have been aligned aslant in advance, the bound can be decreased.

The above embodiment explained the MVA type liquid crystal panel having the plurality of regions where the liquid crystals are vertically aligned, but the present invention is not limited to the MVA type liquid crystal panel, but is applicable to even the general VA type liquid crystal panel.

INDUSTRIAL APPLICABILITY

As explained hereinabove, according to the present invention, it is possible to provide the liquid crystal display device in which, when the MVA or VA type liquid crystal panel in which n type liquid crystals are vertically aligned is driven, the response time when the black state is switched to the low brightness halftone state is shortened, and the overshoot when the black state is switched to the high brightness halftone state or the white state is decreased; and its drive method.

The invention claimed is:

1. A liquid crystal display device, comprising:
a liquid crystal provided between a pixel electrode and a counter electrode to which a drive voltage is applied;
a domain restriction structure for restricting an alignment of the liquid crystal so that the alignment of the liquid crystal is substantially vertical when non-voltage is applied, substantially parallel when a predetermined voltage is applied, and inclined when a smaller voltage than the predetermined voltage is applied, and further a direction that the alignment of the liquid crystal is inclined is set to be a plurality of parts in each pixel when a voltage smaller than the predetermined voltage is applied; and
a drive circuit in which when the pixel is changed from a first transmittance to a second transmittance greater than the first transmittance, a voltage greater than a first target drive voltage corresponding to the second transmittance is applied between the pixel electrode and the counter electrode in a first period of changing to the second transmittance, and the first target display voltage is applied between the pixel electrode and the counter electrode in a second period after the first period, wherein said first period is one frame period.

2. A method of driving a liquid crystal display device including a liquid crystal provided between a pixel electrode and a counter electrode to which a voltage is applied, and a domain restriction structure for restricting an alignment of the liquid crystal so that the alignment of the liquid crystal is substantially vertical when non- voltage is applied, substantially parallel when a predetermined voltage is applied, and inclined when a smaller voltage than the predetermined voltage is applied, and further a direction that the alignment of the liquid crystal is inclined is set to be a plurality of parts in each pixel when a voltage smaller than the predetermined voltage is applied, the method comprising:
when the pixel is changed from a first transmittance to a second transmittance greater than the first transmittance, applying a voltage greater than a first target drive voltage corresponding to the second transmittance between the pixel electrode and the counter electrode in a first period of changing to the second transmittance; and applying the first target display voltage between the pixel electrode and the counter electrode in a second period after the first period,
wherein said first period is one frame period.

3. The method for driving a liquid display device according to claim 2, wherein said domain restriction structure includes first line portions and second line portions in a pixel, said first line portions being extended in a first direction, said second line portions being extended in a second direction that is different from said first direction, and neighboring said first line portions are arranged on opposing substrates when viewed in a direction perpendicular to said substrates.

4. The method for driving a liquid display device according to claim 3, wherein said first line portions are arranged alternately on opposing substrates when viewed generally perpendicularly to said substrates.

5. A method of driving a liquid crystal display device including a liquid crystal provided between a pixel electrode and a counter electrode to which a voltage is applied, and a domain restriction structure for restricting an alignment of the liquid crystal so that the alignment of the liquid crystal is substantially vertical when non-voltage is applied, substantially parallel when a predetermined voltage is applied, and inclined when a smaller voltage than the predetermined voltage is applied, and further a direction that the alignment of the liquid crystal is inclined is set to be a plurality of parts in each pixel when a voltage smaller than the predetermined voltage is applied, wherein said domain restriction structure includes first line portions and second line portions in a pixel, said first line portions being extended in a first direction, said second line portions being extended in a second direction that is different from said first direction, and neighboring said first line portions are arranged on opposing substrates when viewed in a direction perpendicular to said substrates, the method comprising:

when the pixel is changed from a first transmittance to a second transmittance greater than the first transmittance, applying a voltage greater than a first target drive voltage corresponding to the second transmittance between the pixel electrode and the counter electrode in a first period of changing to the second transmittance; and applying the first target display voltage between the pixel electrode and the counter electrode in a second period after the first period.

6. The method for driving a liquid display device according to claim 5, wherein said first line portions are arranged alternately on opposing substrates when viewed generally perpendicularly to said substrates.

* * * * *